US008468227B2

(12) United States Patent
Vasudevan et al.

(10) Patent No.: US 8,468,227 B2
(45) Date of Patent: Jun. 18, 2013

(54) SYSTEM AND METHOD FOR RENDERING CONTENT ON MULTIPLE DEVICES

(75) Inventors: Venugopal Vasudevan, Palatine, IL (US); Jayanth P. Mysore, Streamwood, IL (US); Anwar M. Haneef, Palatine, IL (US); Jay R. Almaula, Schaumburg, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 2068 days.

(21) Appl. No.: 10/334,291

(22) Filed: Dec. 31, 2002

(65) Prior Publication Data
US 2004/0267965 A1  Dec. 30, 2004

(51) Int. Cl.
*G06F 15/173* (2006.01)
(52) U.S. Cl.
USPC ........... 709/223; 709/203; 709/219; 709/224; 709/228
(58) Field of Classification Search
USPC ............. 709/203, 219, 223, 224, 228, 229, 709/246
See application file for complete search history.

(56) References Cited

U.S. PATENT DOCUMENTS

| | | | | |
|---|---|---|---|---|
| 5,737,495 | A * | 4/1998 | Adams et al. | 709/231 |
| 5,923,853 | A * | 7/1999 | Danneels | 709/218 |
| 6,167,122 | A | 12/2000 | Titmuss et al. | |
| 6,247,048 | B1 * | 6/2001 | Greer et al. | 709/228 |
| 6,480,607 | B1 * | 11/2002 | Kori et al. | 713/165 |
| 6,621,502 | B1 * | 9/2003 | Nair et al. | 709/206 |
| 6,665,659 | B1 | 12/2003 | Logan | |
| 7,284,046 | B1 * | 10/2007 | Kreiner et al. | 709/223 |
| 2002/0015042 | A1 * | 2/2002 | Robotham et al. | 345/581 |
| 2002/0078144 | A1 * | 6/2002 | Lamkin et al. | 709/203 |
| 2003/0023755 | A1 | 1/2003 | Harris et al. | |

FOREIGN PATENT DOCUMENTS

| | | |
|---|---|---|
| JP | 10174029 | 6/1998 |
| JP | 2002189707 | 7/2002 |
| WO | 0129636 A3 | 4/2001 |
| WO | 0193068 A3 | 12/2001 |

OTHER PUBLICATIONS

International Search Report dated Feb. 8, 2005 re PCT/US03/41320.

(Continued)

*Primary Examiner* — Ario Etienne
*Assistant Examiner* — Ramy Osman
(74) *Attorney, Agent, or Firm* — Daniel R. Bestor; Steven A. May

(57) ABSTRACT

A method for delivering content to be rendered by multiple devices is provided. Indications of resources available to a user are received, the resources including rendering resources, the rendering resources provided by a plurality of devices, each of the plurality of devices being coupled to a network, wherein at least one of the plurality of devices provides at least one rendering resource available for use of the user, and provides at least one rendering resource available for simultaneous use of another user. Content requested by the user is received, the content including a plurality of content types. A mapping of content types to the plurality of devices is determined, wherein the mapping is based on rendering resources provided by each of the plurality of devices. Content types of the content requested by the user are delivered to the plurality of devices according to the mapping, the content types delivered to the plurality of devices via the network.

13 Claims, 15 Drawing Sheets

OTHER PUBLICATIONS

Supplementary European Search Report for European Application No. 03800215.0-2211, Munich, Germany dated Dec. 5, 2008.
European Search Report for European Application No. 03800215.0-2211, Munich, Germany dated Feb. 16, 2009.
Office Action mailed Mar. 30, 2007, in China Patent Application No. 200380108115.2.
Non-Final Office Action mailed Sep. 11, 2007, in Japan Patent Application No. 2004-565724.
Final Office Action mailed Dec. 2, 2008, in Japan Patent Application No. 2004-565724.
IN First Examination Report dated Apr. 19, 2007.
John R. Smith, et al., "Transcoding Internet Content for Heterogeneous Client Devices", IEEE International Conference on Circuits and Systems, May 1998.
R. Han et al., "WebSplitter: a Unified XML Framework for Multi-Device Collaborative Web Browsing," ACM Conference on Computer Supported Cooperative Work (CSCW)(2000), available at http://www.cs.colorado.edu/~rhan/CSCI_7143_002_Fall_2001/Papers/Han2000_WebSplitter.pdf.
J. Herstad et al., "Tailor to Fit It," available at http://iris22.it.jyu/iris22/pub/Herstad_R260-final.pdf, 1999.
H. Wang et al., "ICEBERG: An Internet-core Network Architecture for Integrated Communications," IEEE Personal Communications (2000): Special Issue on IP-based Mobile Telecommunication Networks, available at http://iceberg.cs.berkeley.edu/publications.html.
M. Hori, "Annotation of Web Content for Transcoding," Dagstuhl Seminar: Semantics for WWW, (Mar. 2000) available at http://www.semanticweb.org/events/dagstuhl2000/mhori.pdf.
M. Hori, "Annotation-Based Web Content Transcoding," WWW9 Workshop: Multimedia on the Web, (May 2000) available at http://www.cwi.nl~lynda/www9/www9-ws-hori.pdf.
M. Roman et al., "Gaia: A Middleware Infrastructure to Enable Active Spaces, Revised Paper #20 (2nd Revision)," (Jul. 1, 2002) available at http://choices.cs.uiuc.edu/gaia/papers/GaiaSubmitted3.pdf.
R. Karrer et al., "Location Selection for Active Services," available at http://www-ece.rice.edu/~karrer/papers/hpdc01.pdf (Dec. 19, 2002).
S. Shafer et al., "Easy Living," Microsoft Corporation (2001), available at http://research.microsoft.com/easyliving.
S. Shafer, "What is Ubiquitous Computing?" Microsoft Corporation (2000), available at http://research.microsoft.com/easyliving.
R. Han et al., "Dynamic Adaptation in an Image Transcoding Proxy for Mobile Web Browsing," IEEE Personal Communications Magazine, Dec. 1998, pp. 8-17.
R. Mohan et al., "Adapting Multimedia Internet Content for Universal Access," IEEE Transactions on Multimedia, Mar. 1999, pp. 104-114.
C.-S. Li et al., "Multimedia Content Description in the InfoPyramid," IEEE Proc. Int. Conf. Acoust., Speech, Signal Processing (ICASSP), Seattle, WA, Special session on Signal Processing in Modern Multimedia Standards, May 1998.
J. Smith et al., "Content-based Transcoding of Images in the Internet," Proceedings of the International Conference on Image Processing (ICIP), 1998.
R. Smith et al., "Transcoding Internet Content for Heterogeneous Client Devices," Proc. IEEE Inter. Symp. on Circuits, Syst. (ISCAS), Special session on Next Generation Internet, Jun. 1998.
"Transcoding Technical Papers and Presentations," IBM Research, http://www.research.ibm.com/networked_data_systems/transcoding/Publications/publications.html, printed on Feb. 20, 2003.
A. Haneef, "An Adaptive Multimedia Content Delivery Middleware for Mobile Multi-Device Neighborhoods," Thesis, Univ. of Mass. Amherst, Dept. of Elec. and Comp. Eng. (Sep. 2002).
J. Mysore et al., "A Reconfiguration Stream Orchestration Framework for Mobile Users," Presented at the Third International Conference on Mobile Data Management (MDM 2002), Singapore, Jan. 8-11, 2002.
B. Johanson et al., "Multibrowsing: Moving Web Content Across Multiple Displays," Proceedings of Ubicomp 2001, Atlanta, Sep. 2001 available at http://graphics.stanford/edu/papers/mb_ubicomp01.
S. Marti, "Active Messenger: Email Filtering and Mobile Delivery," Thesis, MIT, School of Architecture and Planning, available at http://web.media.mit.edu/~stefanm/thesis/am.html, Sep. 1999.
E. Skow et al., "A Security Architecture for Application Session Handoff," International Conference on Communications (ICC 2002), Apr. 28-May 2, 2002, available at http://pcl.cs.ucla.edu/projects/imash/docs.htm.
"Pervasive Computing Laboratory: iMASH Documentation," http://pcl.cs.ucla.edu/projects/imash/docs.htm, Feb. 20, 2003.
J. Rekimoto, "A Multiple Device Approach for Supporting Whiteboard-based Interactions," ACM Conference on Human Factors in Computing Systems (CHI '98), Los Angeles, Apr. 1998, available at http://www.csl.sony.co.jp/person/rekimoto/papers/chi98.pdf.
N. Steitz et al., "i-LAND: An Interactive Landscape for Creativity and Innovation," ACM Conference on Human Factors in Computing Systems (CHI '99), Pittsburgh, May 1999, available at http://www.ipsi.fhg.de/ambiente/paper/chi99Reprint.pdf.
A. Fox, "Stanford Interactive Workspaces," Jun. 4, 2002, available at http://snrc.stanford.edu/events/workshop/0602/fox.pdf.
Britton, K H et al.: "Transcoding: extending e-business to new environments", IBM Systems Journal, IBM Corp., Armonk, New York, US, vol. 40, No. 1, Sep. 17, 2001, pp. 153-178.
Butler, M H: "Current Technologies for Device Independence", Hewlett-Packard Laboratories, Palo Alto, CA, US No. HPL-2001-83, Apr. 4, 2001, pp. 1-28.
Vanem, Erik et al.: "Multimedia communications with multiple devices using virtual network service", Wireless Communications and Networking Conference, 2 IEEE, Mar. 17-21, 2002, vol. 1, ISBN: 0-7803-7376-6, pp. 223-227.

* cited by examiner

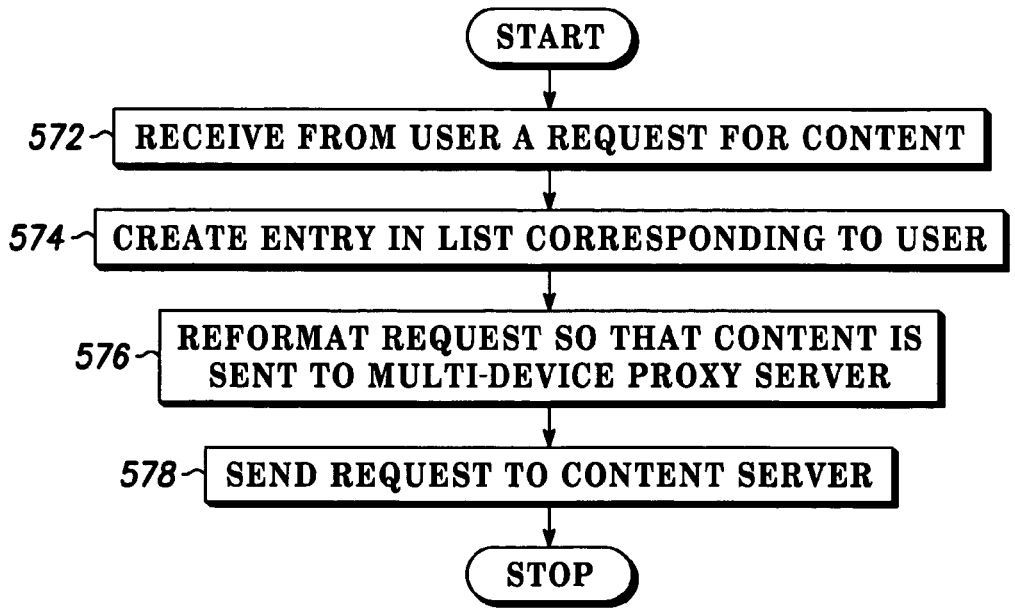
570 FIG. 9
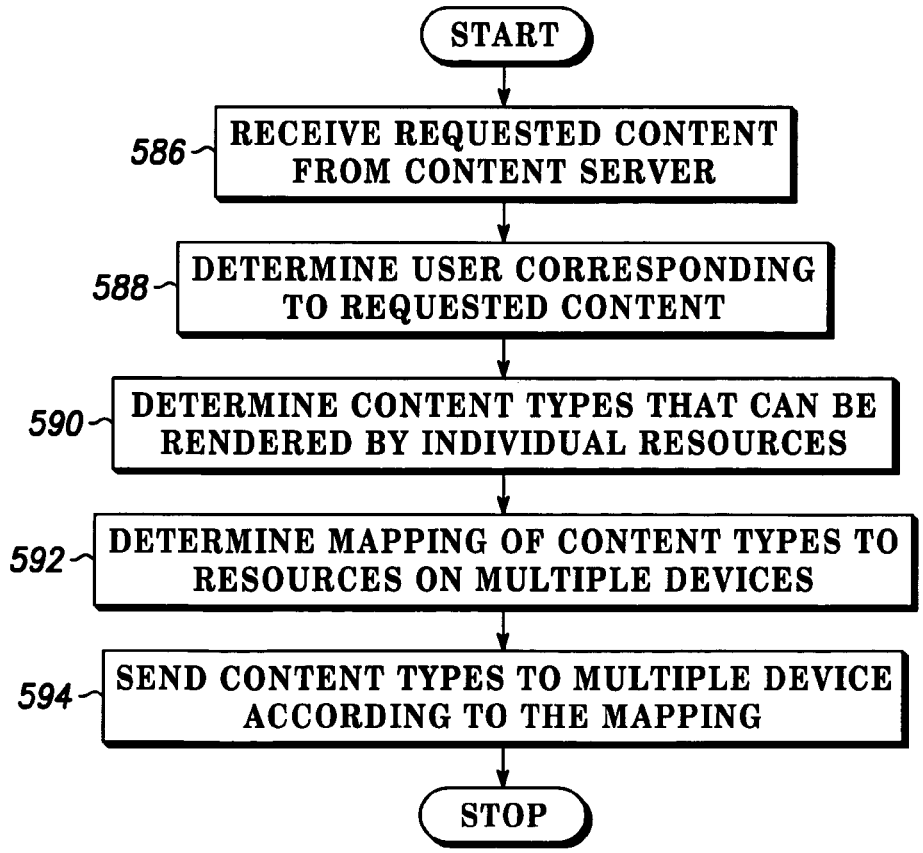
584 FIG. 10

| DEVICE \ CONTENT TYPE | TEXT | GRAPHICS | VIDEO | AUDIO |
|---|---|---|---|---|
| PDA | 10 | 4 | 0 | 0 |
| CELL PHONE | 10 | 2 | 0 | 5 |
| LAPTOP | 10 | 10 | 10 | 10 |

*800* FIG. 14

| DEVICE \ NETWORK | WLAN | GPRS |
|---|---|---|
| PDA | 10 | 5 |
| CELL PHONE | 5 | 10 |
| LAPTOP | 10 | 3 |

*840* FIG. 15

| | CAPTION 1 | AUDIO 1 | VIDEO 1 | AUDIO 2 |
|---|---|---|---|---|
| CAPTION 1 | 0 | 20 | 50 | -100 |
| AUDIO 1 | 20 | 0 | 100 | -100 |
| VIDEO 1 | 50 | 100 | 0 | -100 |
| AUDIO 2 | -100 | -100 | -100 | 0 |

*860* FIG. 16

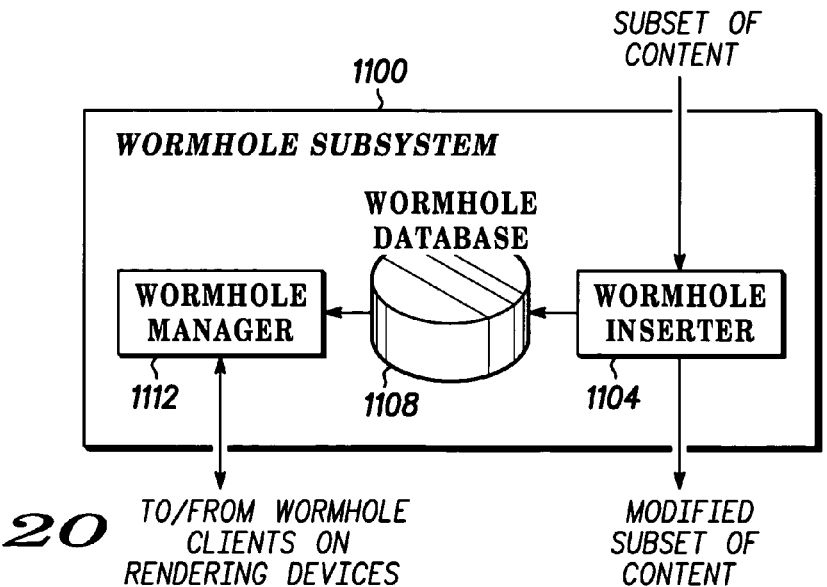
FIG. 20
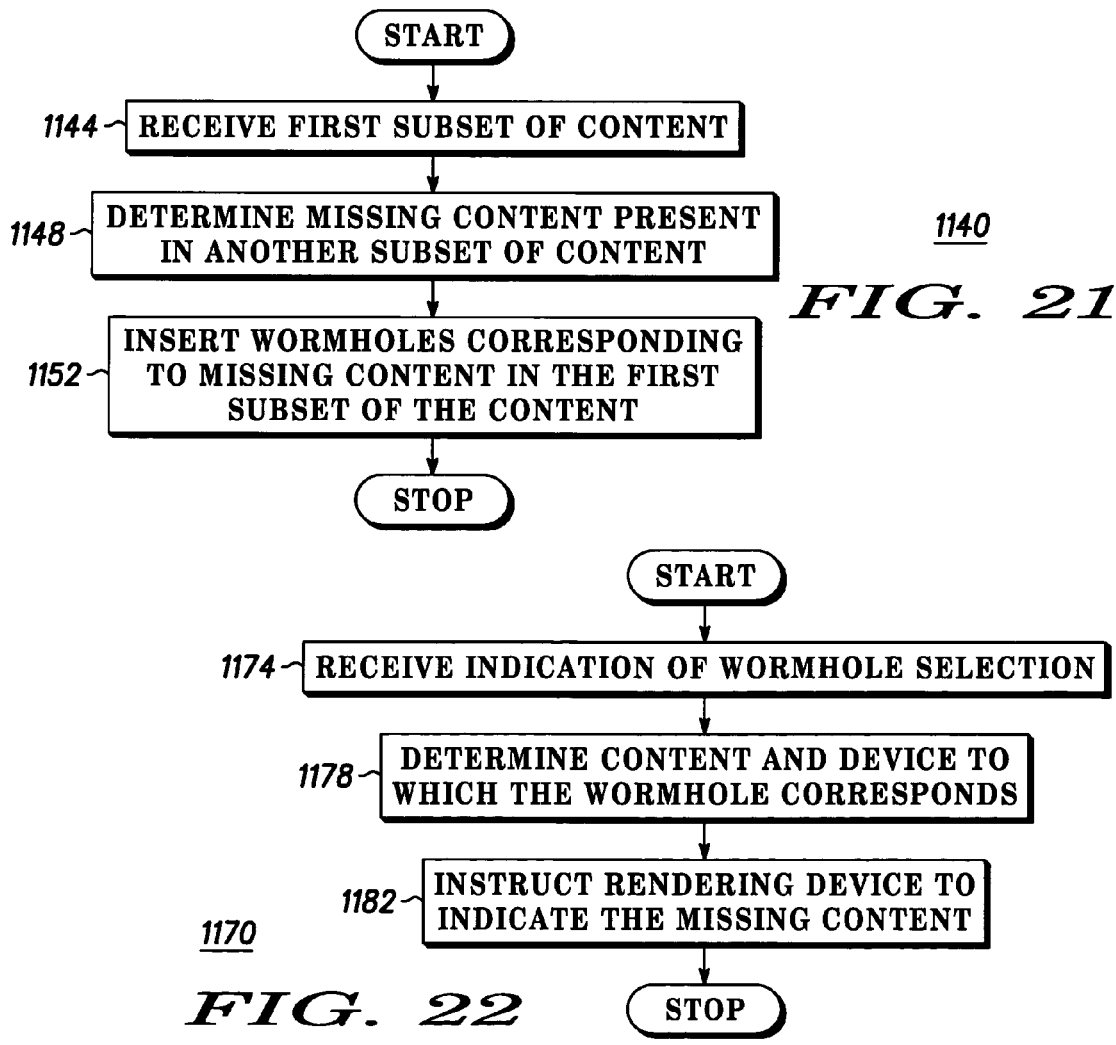
FIG. 21
FIG. 22

SYSTEM AND METHOD FOR RENDERING CONTENT ON MULTIPLE DEVICES

CROSS REFERENCE TO RELATED APPLICATIONS

The present disclosure is related to commonly owned U.S. patent application Ser. No. 10/334,848, entitled "Method and Apparatus for Linking Multimedia Content Rendered Via Multiple Devices," filed on Dec. 31, 2002, which is herein incorporated by reference in its entirety for all purposes.

TECHNICAL FIELD

The present disclosure relates to rendering multimedia content, and more particularly to rendering multimedia content via multiple devices.

BACKGROUND

Some mobile computing devices with limited display capabilities are also provided with web browsing capability. For example, a personal digital assistant (PDA) may include a wireless modem and web browsing software. As another example, a cellular phone may include a display and web browsing software. But because of typical limitations of these devices (e.g., power, memory, display resolution, screen size), they may not be capable of adequately rendering content from the internet that is intended for full-sized computers (e.g., desktop computers, laptop computers, etc.). For example, a display of a PDA or cell phone may be incapable of displaying anything other than text or simple icons because of its display resolution and screen size. Alternatively, the rendering of content by the device may be of too poor quality to be useful. For instance, a picture from a web page that is displayed on a mobile device may be unintelligible because of the display's low resolution, and/or small screen size.

Similarly, mobile computing devices typically may not capable of adequately rendering audio or video streams that may be available to it. For example, a PDA may not include an audio system, or its audio system may be capable of generating only lower quality audio. Such a PDA may not be capable of adequately rendering, for example, an MP3 music file available from the internet.

In some instances, the communication link through which the mobile computing device is linked to the Internet may be a bottleneck. For instance, the bandwidth of a cellular link may not permit adequate rendering of a video stream.

In general, content available via the Internet may not be able to be rendered as intended on many mobile computing devices.

BRIEF DESCRIPTION OF THE DRAWINGS

FIG. 9 is a flow diagram of an example method that may be implemented by the multi-device proxy server.

FIG. 10 is a flow diagram on another example method that may be implemented by the multi-device proxy server.

FIG. 14 is a table illustrating one example format for representing user preferences related to preferred devices for rendering particular types of content.

FIG. 15 is a table illustrating one example format for representing user preferences related to preferred communication links for delivering content to particular types of devices.

FIG. 16 is a table illustrating one example format for representing user preferences related to whether content should be delivered to the same device or different devices.

FIG. 20 is a block diagram of an example subsystem for providing user interface mechanisms that may assist a user with interpreting and navigating content being rendered on multiple devices.

FIG. 21 is a flow diagram of an example method that may be implemented by the example subsystem of FIG. 20.

FIG. 22 is a flow diagram of an example method that may be implemented by the example subsystem of FIG. 20.

DETAILED DESCRIPTION

Example systems and methods are described in which content may be rendered by a plurality of devices. By rendering content on a plurality devices, limitations of a single device may be mitigated. For example, a user may have a PDA with a low resolution display. Additionally, the user may have access to a laptop computer having a display with much higher resolution and/or larger screen size. As described herein, the user may be able to render, for example, a web page that includes text, low resolution graphics, and high resolution graphics using the PDA and the laptop computer. For instance, text and low resolution graphics of the web page can be delivered to, and rendered by, the PDA, and high resolution graphics of the web page can be delivered to, and rendered by, the laptop computer.

System Overview

Figure 1:
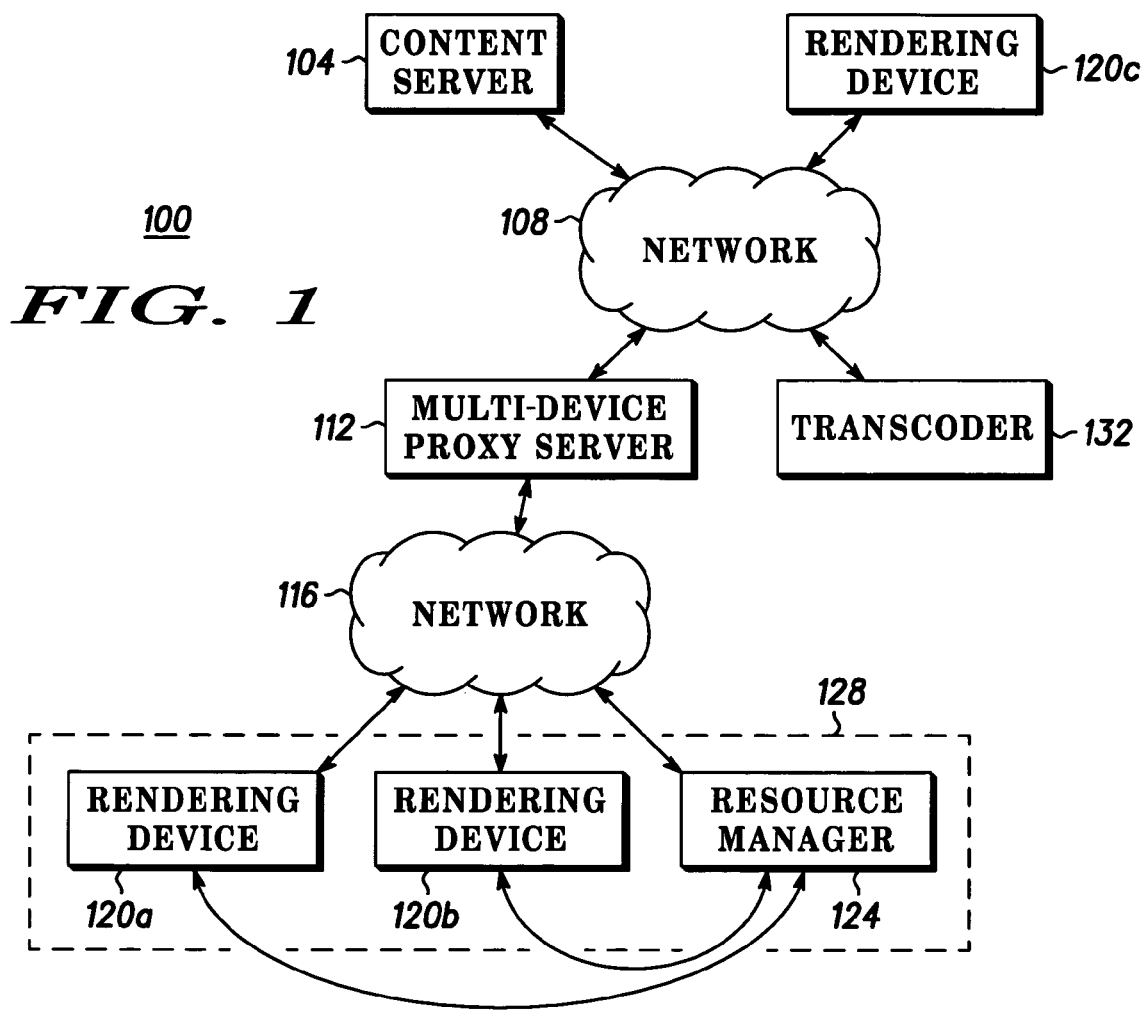
FIG. 1 is a block diagram of an example system that enables delivering of content to multiple devices for rendering on the multiple devices.

FIG. 1 is a block diagram of an example environment 100 in which content may be delivered to multiple devices for rendering on the multiple devices. A content server 104 may be coupled to a network 108. The content server 104 may provide content to users via the network 108. The content may include, for example, web pages, streaming video, streaming audio, etc. A single content server 104 may provide multiple types of content (e.g., web pages, video, audio), or different content servers may provide different types of content (e.g., the environment 100 may include a web page server, a video server, and/or an audio server). The network 108 may comprise a wide area network (WAN), the Internet, an intranet, an extranet, a local area network (LAN), etc.

A multi-device proxy server 112 may also be coupled to the network 108 and to a network 116, and rendering devices 120a and 120b are coupled with the network 116. The multi-device proxy server 112 will be described in more detail below. In general, the multi-device proxy server 112 may act as a gateway between the rendering devices 120a and 120b and the network 108. For example, if information is to be transmitted from a device coupled to the network 108, such as the content server 104, to the rendering device 120a, such information should pass through the multi-device proxy server 112. The network 116 may comprise a local area network, an internet, an intranet, an extranet, a local area network, etc. Although the network 116 is illustrated as being separate from the network 108, the network 116 may be, or include, a subset of the network 108.

A resource manager 124 may be coupled to the network 116. Although the resource manager 124 is illustrated as being separate from the multi-device proxy server 112, some or all of the resource manager 124 may be a component of the multi-device proxy server 112. The resource manager 124 and rendering devices 120a and 120b may be located in a physical neighborhood that is indicated by the box 128. In general, the resource manager 124 may interact with a user device, for example rendering device 120a, to permit a user to access other devices in the neighborhood 128, for example rendering device 120b, for rendering content on those other devices.

One or more rendering devices 120c may also be included that may not be in the physical neighborhood 128 of other rendering devices (e.g., rendering devices 120a and 120b). Such rendering devices 120c may be coupled to the network 108. Although device 120c is termed a rendering device, the device 120c need not be used to render content. For example, the device 120c could be used to store content for later rendering by another device. The rendering devices 120 may comprise a cell phone, a pager, a PDA, a laptop computer, a desk top computer, a workstation, a server, etc.

Also, a transcoder 132 may be coupled to the network 108. The transcoder 132 may be employed to transcode content from the content server 104 that may be in a format that cannot be rendered by one of the rendering devices 120 into a format that can be rendered.

Figure 2:
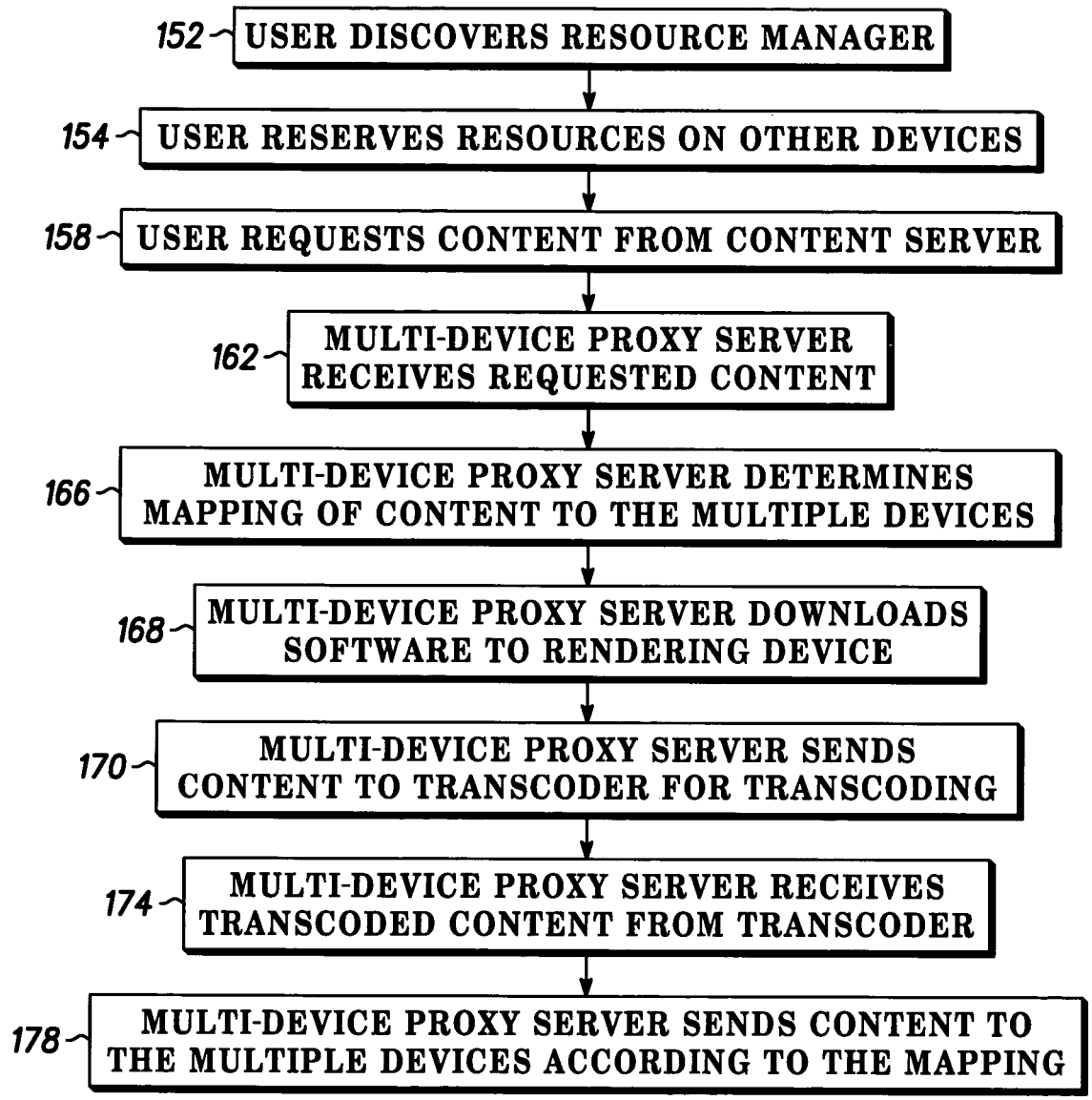
FIG. 2 is a flow diagram of an example method for delivering content to multiple devices for rendering on the multiple devices.

FIG. 2 is a flow diagram of an example method 150 for delivering content to multiple devices, and will be described with reference to FIG. 1.

At block 152, a user, via the rendering device 120a, for example, may discover the resource manager 124 it a neighborhood in which the user is located. This discovery may be accomplished using various techniques including standardized discovery mechanisms such as the Service Location Protocol (SLP), the BLUETOOTH™ standard, Sun Microsystems' Jini technology, technology from the Salutation Consortium, etc.

At block 154, the user may reserve resources for rendering content on devices other than the user's main device. The resources may be software resources or hardware resources. For example, if a user's main device is rendering device 120a, the user may reserve resources on another device it the neighborhood 128, such as rendering device 120b. The user may interact with the resource manager 124, using the rendering device 120a, to reserve resources on the rendering device 120b for rendering content. For example, if the rendering device 120b includes an audio system, the user may reserve the audio system of the device 120b.

Additionally, the user may reserve resources on, or request that content be delivered to, a remote device, such as device 120c. For instance, the user may instruct the multi-device proxy server 112 to deliver certain types of content to the remote device 120c, or to deliver certain specific content (e.g., a file, audio stream, video stream, etc.) to the remote device 120c. In one example, the user may reserve resources on the remote device 120c, or request delivery to the remote device 120c, without interacting with a resource manager 124.

At block 158, the user may request content from the content server 104. For example, the user may request content using the rendering device 120a.

At block 162, content from the content server 104 that was requested by the rendering device 120a may be received by the multi-device proxy server 112. At block 166, the multi-device proxy server 112 may determine a mapping of the requested content to the devices to which the user has access. For example, the mapping may indicate text and graphics should go to device 120a while audio should go to device 120b or device 120c.

In some instances, the multi-device proxy server 112 may download software to a rendering device 120 if it is determined that the rendering device 120 cannot render the content in the format provided by the content server 104 (block 168). The downloaded software may provide the rendering device 120 with the capability to render the content in the format provided by the content server 104.

In some instances, the multi-device proxy server 112 may utilize the transcoder 132 if it is determined that a rendering device cannot render content in the format provided by the content server 104. In such cases, the multi-device proxy server 112 may transmit a portion of the content to the transcoder 132 at block 170. As an example, the transcoder may transcode stereo audio data into mono audio data. Then, at block 174, the multi-device proxy server 112 may receive the transcoded portion of the content from the transcoder 132. Although the transcoder 132 is illustrated as a separate device in FIG. 1, the multi-device proxy server 112 may also include a transcoder as an alternative, or in addition, to the transcoder 132.

At block 178, the multi-device proxy server 112 may deliver the content, or a portion of the content, to the multiple devices according to the mapping determined at block 166.

Also, in some instances, a user may wish to have content delivered to a remote device, such as rendering device 120c. In these cases, the user may instruct the multi-device proxy server 112 to deliver, for example, certain types of content to the remote device 120c. The multi-device proxy server 112 then determines a mapping of the requested content to the devices that to which the user has access, including the remote device 120c. For example, the mapping may indicate text and graphics should go to device 120a while audio should go to device 120c.

Next, the multi-device proxy server 112 delivers the content to the appropriate devices according to the mapping. For example, text and graphics could be delivered to a user's PDA, and audio could be delivered to a desktop, located near the user (e.g. in a conference room in which the user is located), with an audio system. Further, the audio could also be delivered to the user's desktop computer at the user's home for storage on the computer's hard drive, a CD-ROM, a DVD, etc., and/or for processing by software on the user's desktop computer.

Resource Manager

The resource manager 124 may be located within, nearby, or remote from the physical neighborhood 128. As discussed above, some or all of the resource manager 124 may be a component of the multi-device proxy server 112. Alternatively, the resource manager 124 may be entirely separate from the multi-device proxy server 112. The resource manager 124 may be implemented using one or more computers such as a personal computer, workstation, server, mainframe, set-top box, cellular base station computer, etc. In some examples, one instance of a resource manager 124 may correspond to each neighborhood, whereas in other examples, one instance of a resource manager 124 may correspond to several neighborhoods.

Figure 3:
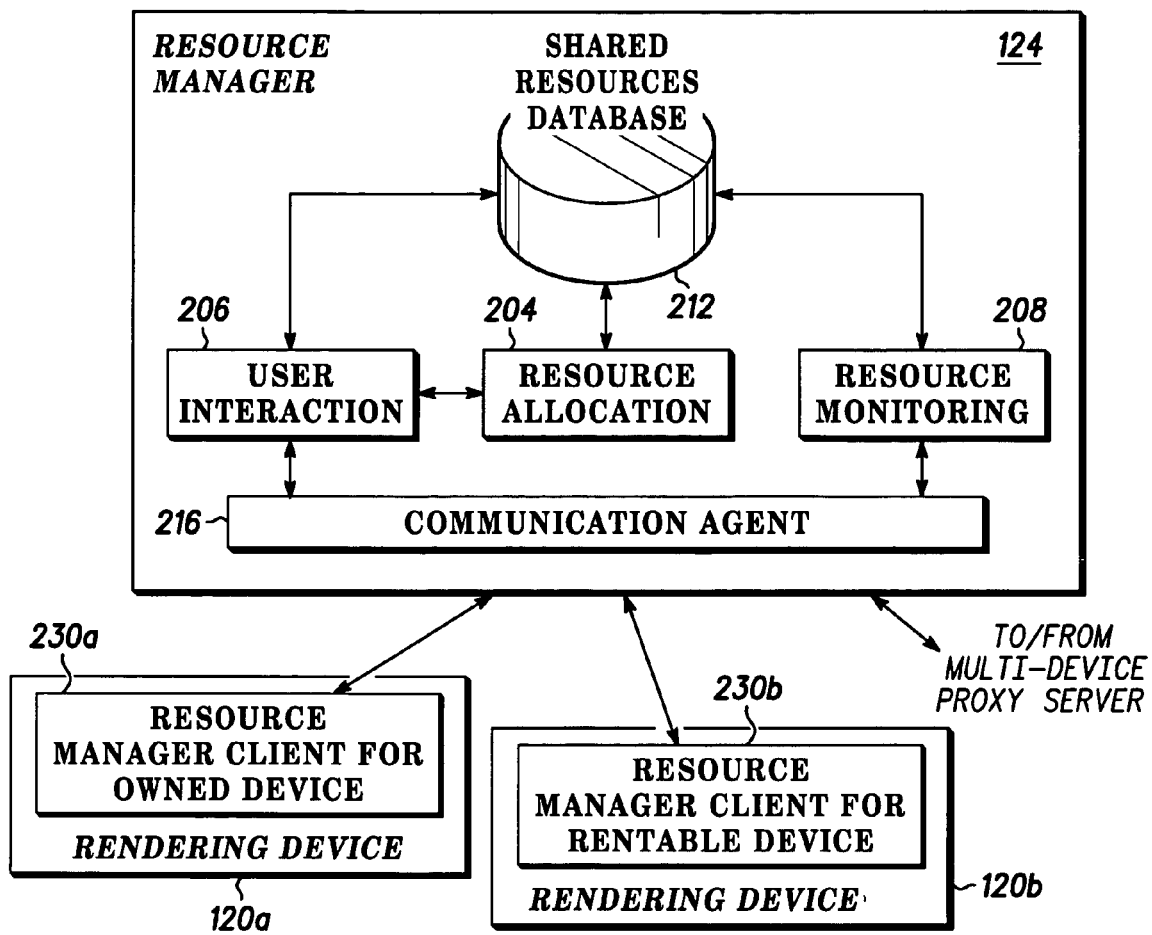
FIG. 3 is a block diagram of an example resource manager, and illustrates an example of its interaction with other systems.

FIG. 3 is a block diagram of an example resource manager 124, and illustrates an example of its interaction with other systems, including rendering devices 120. The resource manager 124 may include a resource allocation subsystem 204, a user interaction subsystem 206, a resource monitoring subsystem 208, and a shared resources database 212. The resource manager 124 may also include a communication agent 216 for communicating with other systems such as rendering devices 120 and the multi-device proxy server 112. Any type of suitable protocol may be used to communicate with other systems. For example, protocols such as the Session Invitation Protocol (SIP), Hyper Text Transfer Protocol (HTTP), Simple Mail Transfer Protocol (SMTP), etc. or a similar proprietary protocol may be used.

Communication with other systems may be, for example, via the network 108, the network 116, and/or direct communication with rendering devices proximate to the resource manager 124. Such communication may include communication via a wired communication link such as a LAN, a telephone line, a cable line, a fiber optic line, etc., or a wireless link such as a wireless LAN (e.g., the IEEE 802.11x standards), a wireless communication link according to the BLUETOOTH™ standard, a cellular link, a two-way paging link, etc.

The resource monitoring subsystem 208 may communicate with devices in a neighborhood to determine what resources are available to users. For example, a conference room may include a computer having a full-size display and an audio system. The resource monitoring subsystem 208 may communicate with this computer to ascertain that the computer has resources available for use, such as its display and its audio system. The resource manager 124 may treat a device as an aggregate of component resources. Thus, multiple users may be able to share a single device.

The user interaction subsystem 206 may interact with a user to permit the user to reserve resources on devices in the neighborhood that are managed by the resource manager 124. The user interaction subsystem 206 may advertise services of the resource manager to users in the neighborhood. It may advertise using various techniques including standardized mechanisms such as the SLP, the BLUETOOTH™ standard, Sun Microsystems' Jini technology, technology from the Salutation Consortium, etc.

For example, a user in a conference room may, using a PDA, communicate with the user interaction subsystem 206 to determine what resources are available in the conference room, and to reserve some or all of those resources.

The user interaction subsystem 206 may communicate with the shared resources database 212 to store/retrieve information relating to, for example, total resources in a neighborhood, reserved resources in the neighborhood, available resources in the neighborhood, etc. It may additionally communicate with the resource allocation subsystem to enforce access control policies, charging policies, etc. set by the owner(s) of the resources that the user wishes to reserve.

The resource manager 124 may communicate with devices in a neighborhood 128, such as rendering devices 120a and 120b. Rendering device 120a may be, for example, a device having resources that a user does not want to make available to others. Such a device will be referred to herein as an "owned device." Rendering device 120b may be, for example, a device having resources which may be made available for use by others. Such a device will be referred to herein as a "rentable device." The rendering devices 120a and 120b may each include resource manager clients 230a and 230b respectively. The resource manager clients 230a and 230b may be the same, or they may differ, for example, depending on whether its corresponding rendering device is an owned device or a rentable device. The resource manager clients 230 may interact with the resource manager 124 to request resources for a user, notify the resource manager 124 regarding the device's resources, update the resource manager 124 about the current state of a resource, etc.

Figure 4:
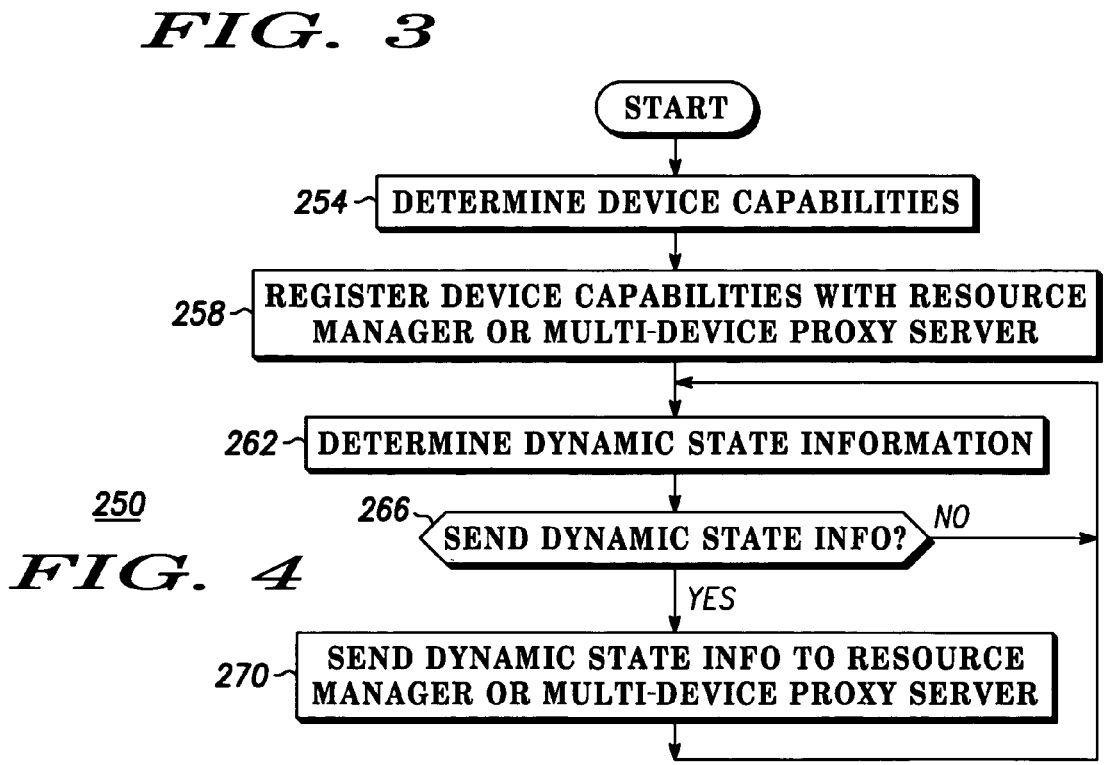
FIG. 4 is a flow diagram of an example method that may be implemented by the resource manager client.

FIG. 4 is a flow diagram of an example method that may be implemented by the resource manager client 230. The method 250 may be implemented by a processor configured by software on a tangible medium such as a CD-ROM, a floppy disk, a hard drive, a digital versatile disk (DVD), or a memory associated with the processor. Persons of ordinary skill in the art will readily appreciate that the entire method 250 or parts thereof could alternatively be executed by a device other than a processor, and/or embodied in firmware and/or dedicated hardware in a well known manner. Further, although the example method is described with reference to the flow diagram in FIG. 4, persons of ordinary skill in the art will readily appreciate that many other methods may alternatively be used. For example, the order of execution of the blocks may be changed, and/or the blocks may be changed, eliminated, or combined.

The method 250 may be used to inform the resource manager 124 and/or the multi-device proxy server 112 of resource capabilities and/or availability of a rendering resource.

At block 254, capabilities of the rendering device may be determined. For example, device capabilities may be determined by querying system software, reading from a list, registry, database, etc. Device capabilities may include information relating to the device type, the device's processor (e.g., type, speed, etc.), memory/storage (e.g., type, size, etc.), communication link (e.g., type, proxy server for the particular link, maximum bandwidth, etc.), display (e.g., display size, display resolution, whether the display is a color display, bits per pixel, etc.), sound system (whether present, type, etc.), etc.

At block 258, the device capabilities may be registered with the resource manager 124 and/or the multi-device proxy server 112. For example, an owned device may register device capabilities with the multi-device proxy server 112, whereas a rentable device may register device capabilities with a resource manager 124 associated with a neighborhood in which the rentable device is located. The device capabilities may be expressed using a variety of mechanisms including standardized mechanisms such as the Composite Capability/Preference Profiles (CC/PP) framework, a proprietary protocol, etc.

At block 262, dynamic state information for the device may be determined. For example, dynamic state information for the device may be determined by querying system software, reading from a list, registry, database, etc. Dynamic state information may include information relating to the device's processor (e.g., current load, load available to a user), memory (e.g., utilization, amount available), communication link (e.g., bandwidth available), display (e.g., percentage used, maximum window size available, etc.), availability of the sound system (whether currently in use), etc.

At block 266, it may be determined whether the dynamic state information determined at block 262 should be transmitted to the resource manager 124 and/or the multi-device proxy server 112. For example, dynamic state information may be transmitted upon power-up of the device, periodically, upon a change in the dynamic state information, etc.

If dynamic state information need not be transmitted, the flow may proceed to block 262. If dynamic state information should be transmitted, the flow may proceed to block 270. At block 270, dynamic state information may be transmitted to the resource manager 124 and/or the multi-device proxy server 112. For example, an owned device may transmit dynamic state information to the multi-device proxy server 112, whereas a rentable device may transmit dynamic state information to a resource manager 124 associated with a neighborhood in which the rentable device is located. A proprietary mechanism may be used to express dynamic state. An example extension to the CC/PP framework that provides dynamic state information for a device may be:

```
<?xml version="1.0"?>
<rdf:RDF xmlns:rdf="http://www.w3.org/1999/02/22-rdf-syntax-ns#">
    <rdf:Description rdf:about="CPU">
        <Load>0.3</Load>
        <User>0.1</User>
    </rdf:Description>
    <rdf:Description rdf:about="Memory">
        <Utilization>0.4</Utilization>
        <Available>100K</Available>
    </rdf:Description>
    <rdf:Description rdf:about="Bandwidth">
        <Available>15Kbps</Available>
    </rdf:Description>
    <rdf:Description rdf:about="Display">
        <Available>0.6</Available>
        <Max-rectangle>200x150</Max-rectangle>
    </rdf:Description>
    <rdf:Description rdf:about="Sound">
        <Status>ON</Status>
    </rdf:Description> </rdf:RDF>
``` where "CPU . . . Load" may be a number between 0 and 1 that indicates the current percentage load of the central processing unit (CPU), "CPU . . . User" may be a number between 0 and 1 that indicates percentage load of the CPU available to a user, "Memory . . . Utilization" may be a number between 0 and 1 that indicates the current utilization of the memory, "Memory . . . Available" may be a number indicating the amount of memory available, "Bandwidth" may be a number indicating the current bandwidth available to the device on the communication link, "Display . . . Available" may be a number between 0 and 1 indicating the percentage of the display available, "Display . . . Max-rectangle" may be provide the dimensions in pixels of a maximum rectangle on the display available to a user, and "Sound . . . Status" may be a text value indicating whether the sound system is in use.

A complete list of dynamic state information need not be sent at block 270. For example, if only particular dynamic state information has changed since the last transmission of dynamic state information, only the changed dynamic state information may be transmitted.

After the dynamic state information is transmitted, the flow may return to block 262.

Figure 5:
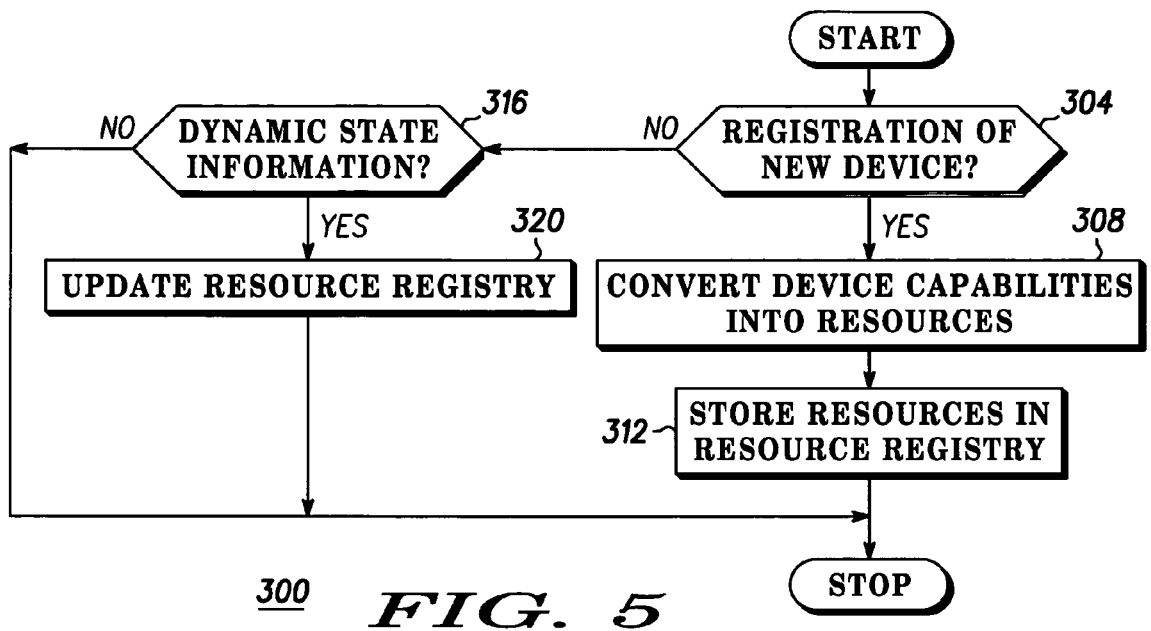
FIG. 5 is a flow diagram of an example method that may be implemented by the resource manager.

FIG. 5 is a flow diagram of an example method that may be implemented by the resource manager 124. In particular, the method 300 may be implemented by the resource monitor subsystem 208. The method 300 may be implemented by a processor configured by software on a tangible medium such as a CD-ROM, a floppy disk, a hard drive, a digital versatile disk (DVD), or a memory associated with the processor. Persons of ordinary skill in the art will readily appreciate that the entire method 300 or parts thereof could alternatively be executed by a device other than a processor, and/or embodied in firmware and/or dedicated hardware in a well known manner. Further, although the example method is described with reference to the flow diagram in FIG. 5, persons of ordinary skill in the art will readily appreciate that many other methods may alternatively be used. For example, the order of execution of the blocks may be changed, and/or the blocks may be changed, eliminated, or combined.

The method 300 may be used to process device capabilities and dynamic state information received from rentable rendering devices in a particular neighborhood.

At block 304, it may be determined whether information received from the rendering device 120 corresponds to a registration of a new device. If it is a registration of a new device, the flow may proceed to block 308. At block 308, the device capabilities of the new device may be converted into one or more resources. At block 312, the one or more resources determined at block 308 may be stored in a resource registry. The resource registry may indicate, for example, resources in a neighborhood that may be reserved and used/shared by one or more users. Referring back to FIG. 3, the resource registry may be included in the shared resources database 212.

If at block 304 it is determined that the received information is not a registration of a new device, the flow may proceed to block 316. At block 316, it may be determined whether the received information corresponds to dynamic state information for a rendering device 120. If it does correspond to dynamic state information, the flow may proceed to block 320. At block 320, the dynamic state information may be used to update corresponding resource information in the resource registry.

Figure 6:
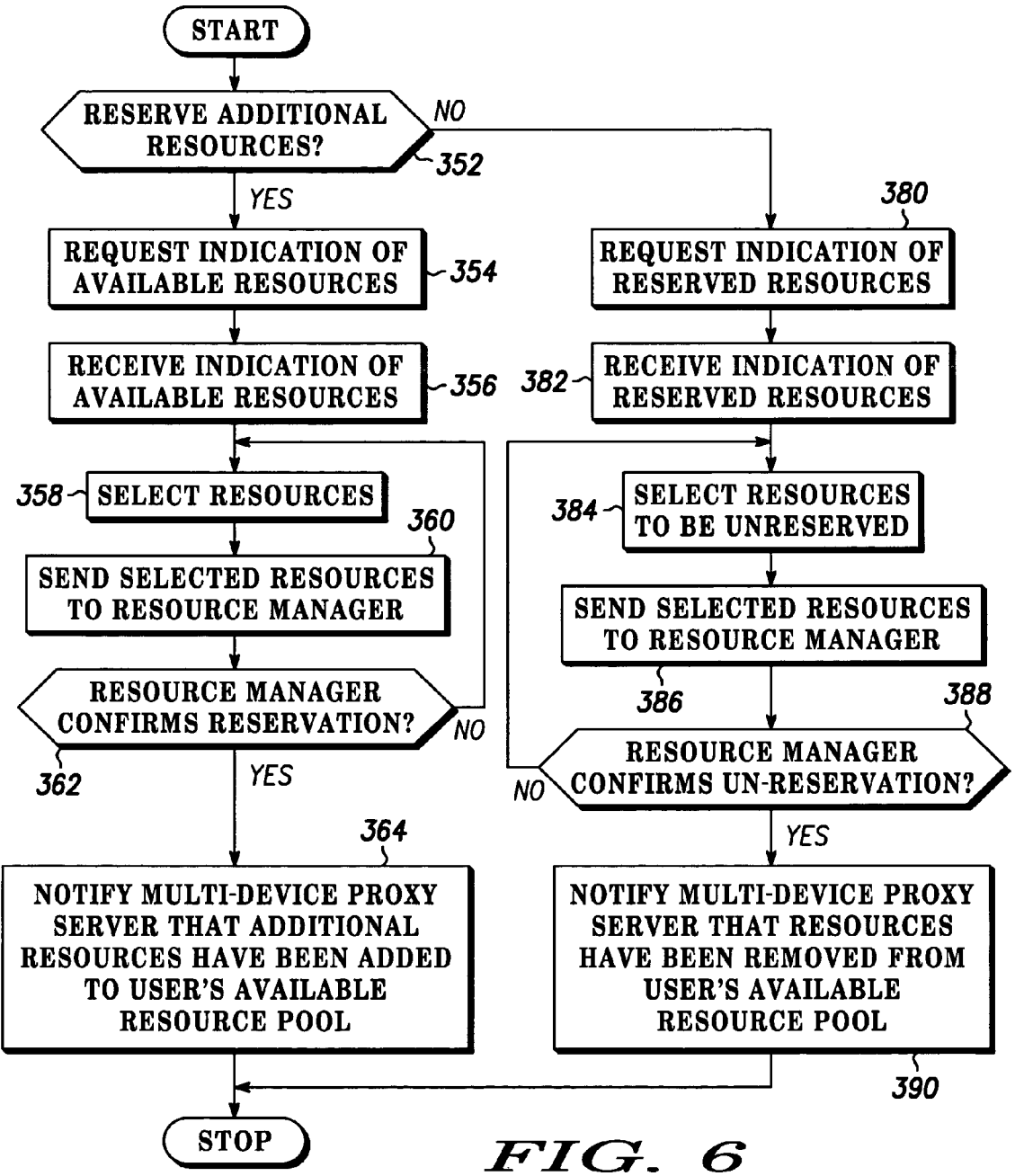
FIG. 6 is a flow diagram of an example method that may be implemented by the resource manager client of an owned rendering device.

FIG. 6 is a flow diagram of an example method that may be implemented by the resource manager client 230 of an owned rendering device that a user uses to interact with the resource manager. The method 350 may be implemented by a processor configured by software on a tangible medium such as a CD-ROM, a floppy disk, a hard drive, a digital versatile disk (DVD), or a memory associated with the processor. Persons of ordinary skill in the art will readily appreciate that the entire method 350 or parts thereof could alternatively be executed by a device other than a processor, and/or embodied in firmware and/or dedicated hardware in a well known manner. Further, although the example method is described with reference to the flow diagram in FIG. 6, persons of ordinary skill in the art will readily appreciate that many other methods may alternatively be used. For example, the order of execution of the blocks may be changed, and/or the blocks may be changed, eliminated, or combined.

The method 350 may be used to reserve and/or unreserve resources of rendering devices 120 in a neighborhood using the resource manager 124. Reserving/unreserving a resource may include reserving/unreserving the entire resource or a portion of the resource. For example, if a user has reserved 50% of a display screen, the user may unreserved half of that resource, thus giving the user 25% of the display screen.

At block 352, it may be determined whether the user desires to reserve additional resources, or whether the user desires to unreserve resources. If the user desires to reserve additional resources, the flow may proceed to block 354.

At block 354, a request for an indication of available resources in the neighborhood may be transmitted to the resource manager 124. At block 356, an indication of available resources in the neighborhood may be received from the resource manager 124. The indication of available resources may include, for example, a list of resources. Additionally, the indication of available resources may also provide indications of the devices associated with the available resources.

At block 358, the user may select one or more resources that the user wishes to reserve. For example, the user may use a touch screen, keypad, stylus, mouse, etc. to select particular resources from a list of resources. At block 360, the selected resources may be transmitted to the resource manager 124.

At block 362, it may be determined whether the resource manager 124 confirmed that the user reserved the selected resources sent at block 360. If a confirmation is received, the flow may proceed to block 364. At block 364, the rendering device 120 that implements the method 350 may send a notification to the multi-device proxy server 112 indicating that the additional resources selected at block 360 are to be added to an available resources pool associated with the user. As an alternative, and as will be described subsequently, the resource manager 124 may send such a notification.

If at block 362, it is determined that the resource manager 124 did not confirm that the user reserved the selected resources, the flow may proceed back to block 358.

If at block 352, it is determined that the user desires to unreserve resources, the flow may proceed to block 380. At block 380, a request for an indication of resources in the neighborhood reserved by the user may be transmitted to the resource manager 124. At block 382, an indication of reserved resources may be received from the resource manager 124. The indication of reserved resources may include, for example, a list of resources. Additionally, the indication of reserved resources may also provide indications of the devices associated with the reserved resources.

At block 384, the user may select one or more resources that the user wishes to unreserve. For example, the user may use a touch screen, keypad, stylus, mouse, etc. to select particular resources from a list of resources. At block 386, the selected resources may be transmitted to the resource manager 124.

At block 388, it may be determined whether the resource manager 124 confirmed that the user unreserved the selected resources sent at block 386. If a confirmation is received, the flow may proceed to block 390. At block 390, the rendering device 120 that implements the method 350 may send a notification to the multi-device proxy server 112 indicating that the resources selected at block 384 are to be removed from the available resources pool associated with the user. As an alternative, and as will be described subsequently, the resource manager 124 may send such a notification.

If at block 388, it is determined that the resource manager 124 did not confirm that the user unreserved the selected resources, the flow may proceed back to block 384.

Figure 7:
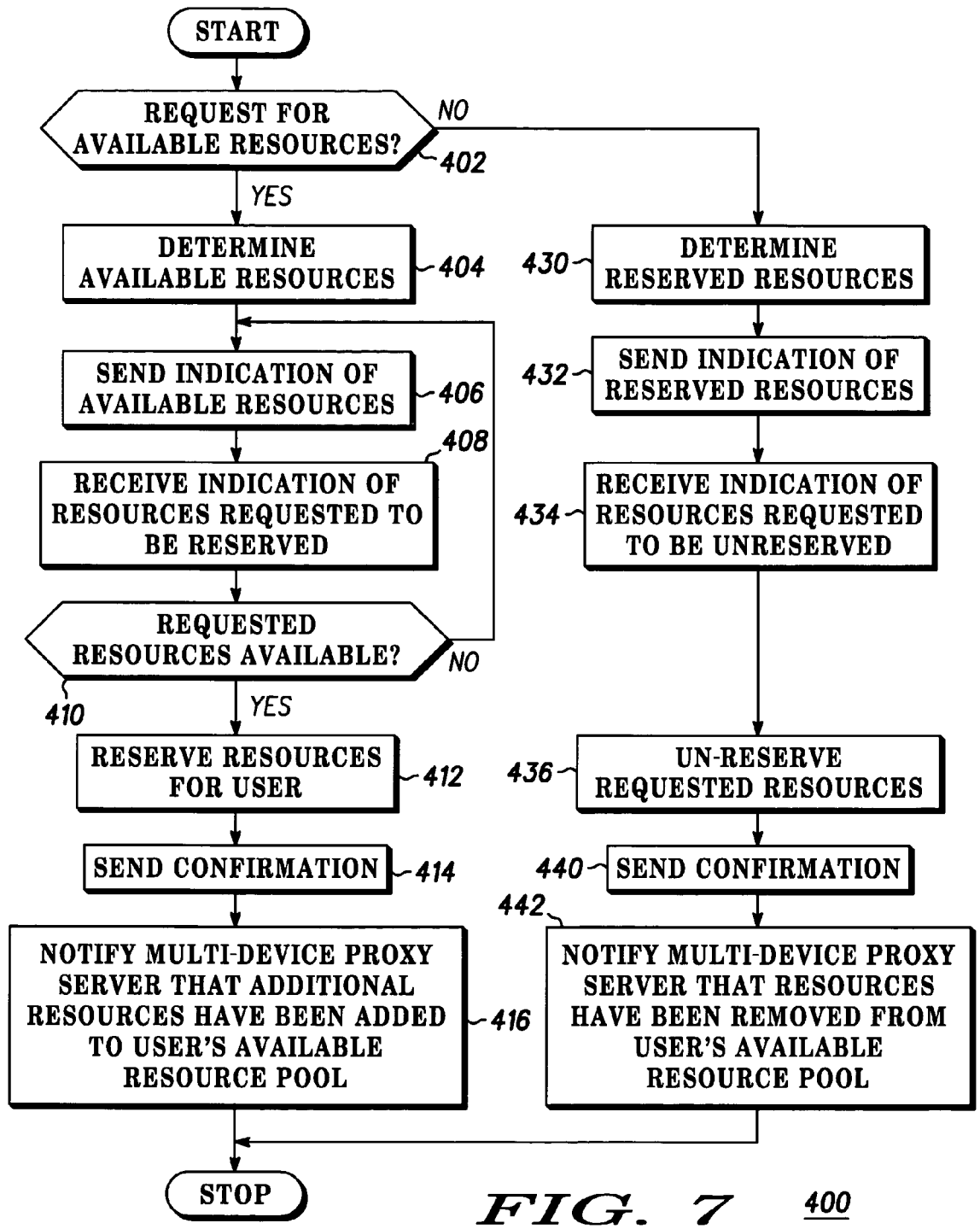
FIG. 7 is a flow diagram of an example method that may be implemented by the resource manager.

FIG. 7 is a flow diagram of an example method that may be implemented by the resource manager 124. In particular, the method 400 may be implemented by the user interaction subsystem 206. The method 400 may be implemented by a processor configured by software on a tangible medium such as a CD-ROM, a floppy disk, a hard drive, a digital versatile disk (DVD), or a memory associated with the processor. Persons of ordinary skill in the art will readily appreciate that the entire method 400 or parts thereof could alternatively be executed by a device other than a processor, and/or embodied in firmware and/or dedicated hardware in a well known manner. Further, although the example method is described with reference to the flow diagram in FIG. 7, persons of ordinary skill in the art will readily appreciate that many other methods may alternatively be used. For example, the order of execution of the blocks may be changed, and/or the blocks may be changed, eliminated, or combined.

The method 400 may be used to reserve and/or unreserve resources of rendering devices 120 in a neighborhood for a user.

At block 402, it may be determined whether the user desires to reserve additional resources, or whether the user desires to unreserve resources. If the user desires to reserve additional resources, the flow may proceed to block 404.

At block 404, it may be determined what resources are available in a particular neighborhood. This may include determining what resources are in the neighborhood, and then determining which of those resources are available. The user interaction subsystem 206 may determine resources available in the neighborhood by querying the shared resources database 212. Additionally, if the resource is a rentable resource, the user interaction subsystem 206 may determine which of the resources are available based on access control policies, charging policies, etc. enforced by the resource allocation subsystem 204.

At block 406, an indication of available resources in the neighborhood may be sent to the user's owned rendering device 120. The indication of available resources may include, for example, a list of resources. Additionally, the indication of available resources may also provide indications of the devices associated with the available resources. At block 408, an indication of resources selected by the user may be received.

At block 410, it may be determined whether the selected resources are still available. For example, the user interaction subsystem 206 may determine whether the selected resources are still available by querying the shared resources database 212. If the selected resources are no longer available, the flow may proceed back to block 406. If the selected resources are still available, the flow may proceed to block 412.

At block 412, the selected resources may be reserved for the user. For example, the user interaction subsystem 206 may modify the shared resources database 212 to indicate that the selected resources are reserved by the user.

At block 414, a confirmation may be sent to the user, confirming that the selected resources have been reserved. At block 416, the resource manager 124 may send a notification to the multi-device proxy server 112 indicating that the additional resources reserved at block 412 are to be added to an available resources pool associated with the user. As an alternative, and as was described previously, a rendering device may send such a notification.

If at block 402, it is determined that the user desires to unreserve resources, the flow may proceed to block 430. At block 430, it may be determined what resources are currently reserved by the user in the neighborhood. For example, the resource allocation subsystem 204 may determine resources reserved by the user in the neighborhood by querying the shared resources database 212.

At block 432, an indication of reserved resources in the neighborhood may be sent to the user's owned rendering device 120. The indication of reserved resources may include, for example, a list of resources. Additionally, the indication of reserved resources may also provide indications of the devices associated with the reserved resources. At block 434, an indication of resources selected by the user may be received.

At block 436, the selected resources may be unreserved. For example, the resource allocation subsystem 204 may modify the shared resources database 212 to indicate that the selected resources are unreserved by the user and may be made available to other users.

At block 440, a confirmation may be sent to the user, confirming that the selected resources have been unreserved. At block 442, the resource manager 124 may send a notification to the multi-device proxy server 112 indicating that the resources unreserved at block 436 are to be removed from an available resources pool associated with the user. As an alternative, and as was described previously, a rendering device may send such a notification.

Multi-Device Proxy Server

As described previously, the multi-device proxy server 112 typically acts as a proxy to a user in a multi-device communication environment. As just one specific example, the multi-device proxy server 112 may be implemented as an extension to a wireless application protocol (WAP) proxy server. The multi-device proxy server 112 may comprise one or more computers such as a personal computers, workstations, servers, mainframes, etc.

Figure 8:
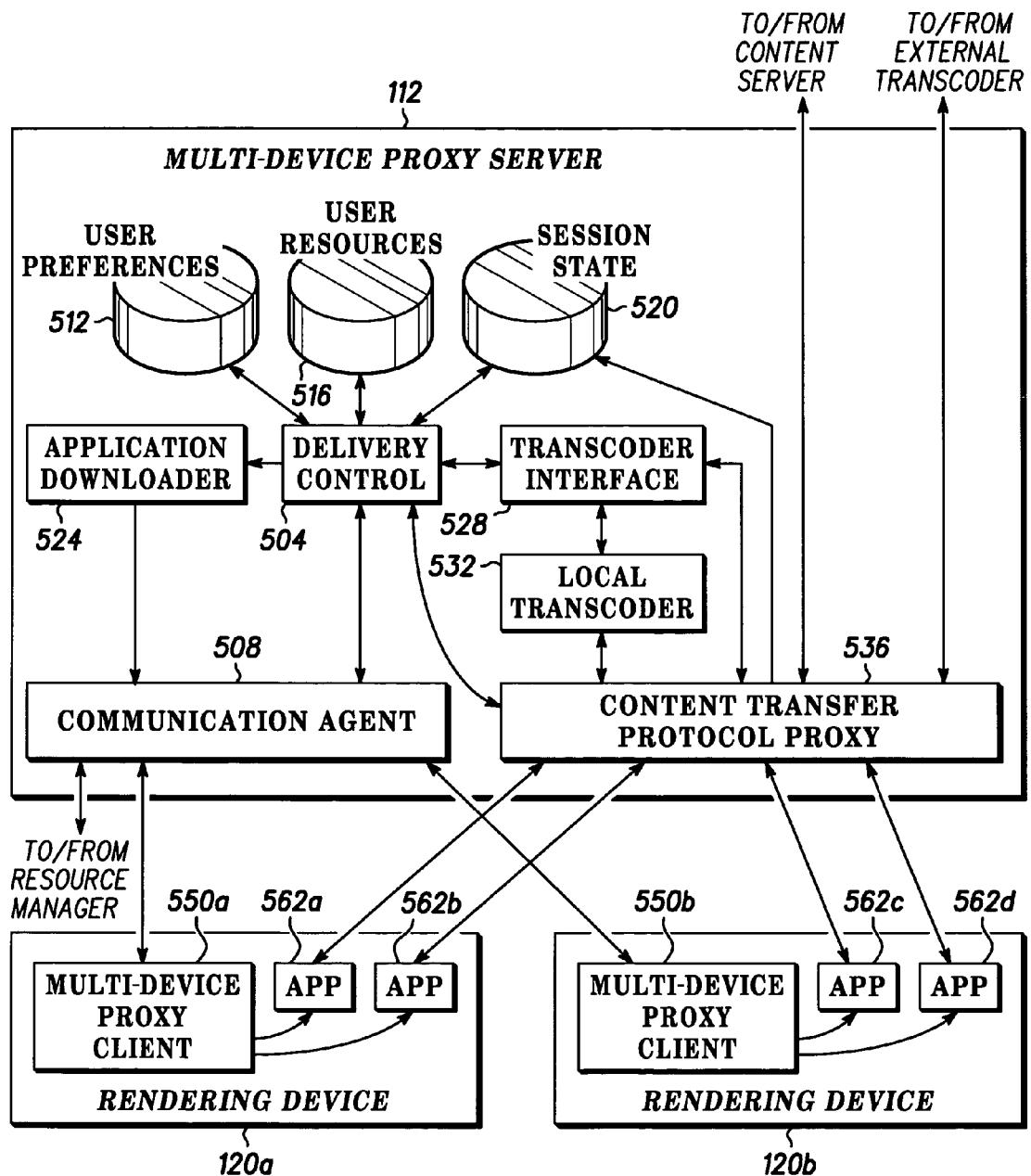
FIG. 8 is a block diagram of an example multi-device proxy server, and illustrates an example of its interaction with other systems.

FIG. 8 is a block diagram of an example multi-device proxy server 112, and illustrates an example of its interaction with other systems, including rendering devices 120. FIG. 8 will be described with reference to FIG. 1.

The multi-device proxy server 112 may comprise a delivery control subsystem 504. The deliver control subsystem may communicate with other systems such as rendering devices 120 and the resource manager 124 via a communication agent 508. The communication agent 508 may be the same as, or similar to, the communication agent 216 of the resource manager 124.

The multi-device proxy server 112 may also comprise a user preferences database 512, a user resources database 516, and a session state database 520. The delivery control subsystem 504 may store data to, and read data from, each of these databases.

The user preferences database 512 may include information relating to preferences of a user for rendering content on multiple devices. The user preferences database 512 may include information relating to, for example, preferred devices for rendering certain types of content (e.g., preferable that video be rendered on computer with a full size display rather than a cell phone), preferred splitting of content (e.g., prefer that two different streams of audio be routed to different devices rather than same device), preferred network for delivery (e.g., prefer that data delivered to cell phone be delivered via cell phone network rather than wireless LAN network).

The user resources database 516 may include information relating to the resources available to a particular user. For example, information indicating that a particular user has an owned PDA and has reserved a display of desktop computer may be stored in the user resources database 516.

The session state database 520 may include information relating to the state of a particular user's session. This information may include, for example, the types of content being, or to be, delivered (e.g., text, video, audio). Content type information may also include information relating to the format of the content (e.g., a video data rate, stereo audio vs. mono audio, etc.). The session state database 520 may also include information relating to the transport layer such as the addresses of the remote devices used, the port numbers used on those devices, etc.

The multi-device proxy server 112 may additionally comprise an application downloader 524 that may download to rendering devices applications, for example, to facilitate the rendering of content. The application downloader 524 may be controlled by the delivery control subsystem 504.

The multi-device proxy server 112 may further comprise a transcoder interface 528 that may provide the deliver control subsystem 504 with an interface to a local transcoder 532 (optional) and one or more external transcoders. The transcoder interface 528 may communicate with external transcoders via a variety of protocols including standardized mechanisms for invoking remote procedures such as the Simple Object Access Protocol (SOAP), the Common Gateway Interface (CGI), Sun Microsystems' Remote Method Invocation (RMI) technology, the Internet Content Adaptation Protocol (ICAP), etc.

The content transfer protocol proxy 536 may include one or more different proxies corresponding to different protocols. For example, the content transfer protocol proxy 536 may include an HTTP proxy, a real-time protocol (RTP) proxy, a real time streaming protocol (RTSP) proxy, etc. The content transfer protocol proxy 536 may also include a parser for parsing content according to content types. The content types may include, for example, multipurpose internet mail extensions (MIME) types. The content types may also include types defined, for example, by the author of the content using, for example, an annotation file. For example, content may be authored so that certain of the content can be viewed by certain persons, certain devices, etc.

In general, the content transfer protocol proxy 536 receives content destined for a user, parses the content into content types, and then delivers the content to one or more rendering devices 120 under the control of the delivery control subsystem 504. For example, the content transfer protocol proxy 536 may deliver text and graphics to rendering device 120a, and deliver audio to rendering device 120b. Additionally, the content transfer protocol proxy 536 may send content to, and receive content from, a transcoder (e.g., local transcoder 532 or an external transcoder) under control of the transcoder interface 528. Further, the content transfer protocol proxy 536 may store information regarding the state of a session in the session state database 520. For example, the content transfer protocol proxy 536 may store information relating to the different content types in a content session requested by a user.

The multi-device proxy server 112 may communicate with rendering devices, such as rendering devices 120a, 120b, and 120c (not shown in FIG. 8). Rendering devices 120a and 120c may be, for example, owned devices, and rendering device 120b may be, for example, a rentable device. The rendering devices 120a, 120b, and 120c may each include respective multi-device proxy clients 550. The multi-device proxy clients 550 may be the same for each rendering device, or they may differ, for example, depending on whether its corresponding rendering device is an owned device or a rentable device. The multi-device proxy clients 550 on an owned device may interact with the multi-device proxy server 112 to, for example, notify the multi-device proxy server 112 of resources available to a user, notify the multi-device proxy server 112 of user preferences regarding delivering content to particular devices available to the user, coordinate downloading of applications to facilitate rendering of content, etc. Additionally, the multi-device proxy client 550 may launch applications on the rendering devices 120, such as applications 562, to facilitate the rendering of content. For example, the multi-device proxy client 550 may launch a video player application on the rendering device 120 upon being becoming aware that video content will be, or has begun being, delivered to the rendering device 120.

FIG. 9 is a flow diagram of an example method 570 that may be implemented by the multi-device proxy server 112. The method 570 may be implemented by a processor configured by software on a tangible medium such as a CD-ROM, a floppy disk, a hard drive, a digital, versatile disk (DVD), or a memory associated with the processor. Persons of ordinary skill in the art will readily appreciate that the entire method 570 or parts thereof could alternatively be executed by a device other than a processor, and/or embodied in firmware and/or dedicated hardware in a well known manner. Further, although the example method is described with reference to the flow diagram in FIG. 9, persons of ordinary skill in the art will readily appreciate that many other methods may alternatively be used. For example, the order of execution of the blocks may be changed, and/or the blocks may be changed, eliminated, or combined.

At block 572, a request for content may be received from a user. The request may be destined for a content server. At block 574, an entry in a list may be created, where the entry corresponds to the user that sent the request. The entry may include information so that when the multi-device proxy server 112 receives the requested content, the user corresponding to the content can determined. Examples of such information include a session identifier that may uniquely identify a user's request, the port number on which the request was received, a user identifier that may uniquely identify the user, etc.

At block 576, the request may be reformatted so that the content server sends the requested content to the multi-device proxy server 112. For example, the requestor's identity may be changed from the user's device to that of the multi-device proxy server 112. Then, at block 578, the reformatted request may be sent to the content server.

FIG. 10 is a flow diagram on another example method 584 that may be implemented by the multi-device proxy server 112. The method 584 will be described with reference to FIG. 9. The method 584 may be implemented by a processor configured by software on a tangible medium such as a CD-ROM, a floppy-disk, a hard drive, a DVD, or a memory associated with the processor. Persons of ordinary skill in the art will readily appreciate that the entire method 584 or parts thereof could alternatively be executed by a device other than a processor, and/or embodied in firmware and/or dedicated hardware in a well known manner. Further, although the example method is described with reference to the flow diagram in FIG. 10, persons of ordinary skill in the art will readily appreciate that many other methods may alternatively be used. For example, the order of execution of the blocks may be changed, and/or the blocks may be changed, eliminated, or combined.

At block 586, content that was requested by a user may be received from a content server. For example, the content may be in response to the reformatted request sent to the content server at block 578 of FIG. 9. At block 588, the user that requested the content may be determined. For example, the user may be determined by examining the list in which an entry for the user was created at block 574 of FIG. 9.

At block 590, the requested content may be processed to determine the different content types (e.g., text, graphics, video, audio, etc.) included in the content.

At block 592, a mapping of the content types determined at block 590 to resources available to the user may be determined. The resources available may be on multiple devices. Additionally, the multiple devices may include devices in a neighborhood as well as remote devices. At block 594, the content types may be sent to the multiple devices according to the mapping determined at block 592.

Figure 11:
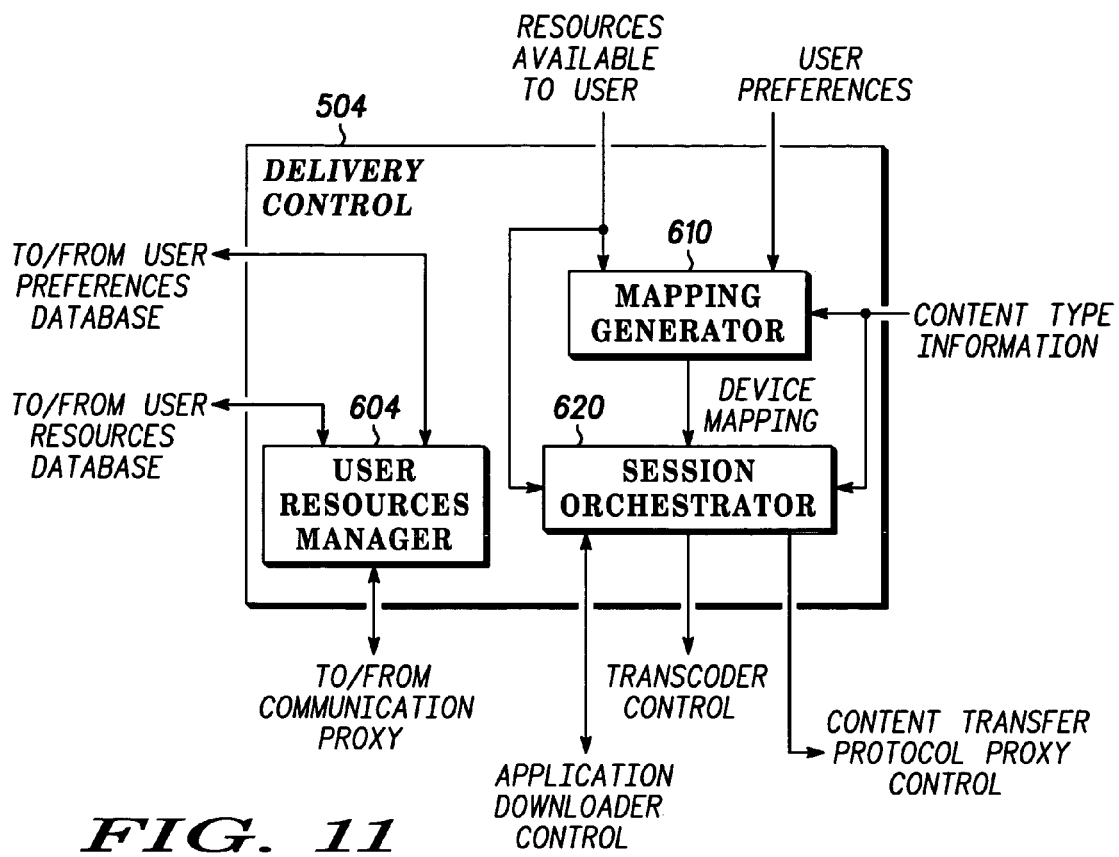
FIG. 11 is a block diagram of an example delivery control subsystem.

FIG. 11 is a block diagram of an example delivery control subsystem 504. FIG. 11 will be described with reference to FIG. 8. The delivery control subsystem may include a user resources manager 604, a mapping generator 610, and a session orchestrator 620. In general, the user resources manager 604 may receive information from an owned rendering device 120 or a resource manager 124, via the communication agent 508, regarding resources that are available to the user. This information may be used to update the user resources database 516. Additionally, the user resources manager 604 may receive information regarding user preferences from an owned rendering device 120, and store this information in the user preferences database 512.

Generally, the mapping generator 610 may receive user preferences information from the user preferences database 512, information relating to resources available to the user from the user resources database 516, and information relating to the content requested by the user from the session state database 520. Based on this information, the mapping generator 610 may generate a mapping of content types to devices available to the user. This device mapping may be provided to the session orchestrator 620.

In general, the session orchestrator 620 may receive the device mapping from the mapping generator 610, and content type information from the session state database 520. Based on this information, the session orchestrator 620 may generate control information for controlling the application downloader 524, the transcoder interface 528, and the content transfer protocol proxy 536.

User Resources Manager

Figure 12:
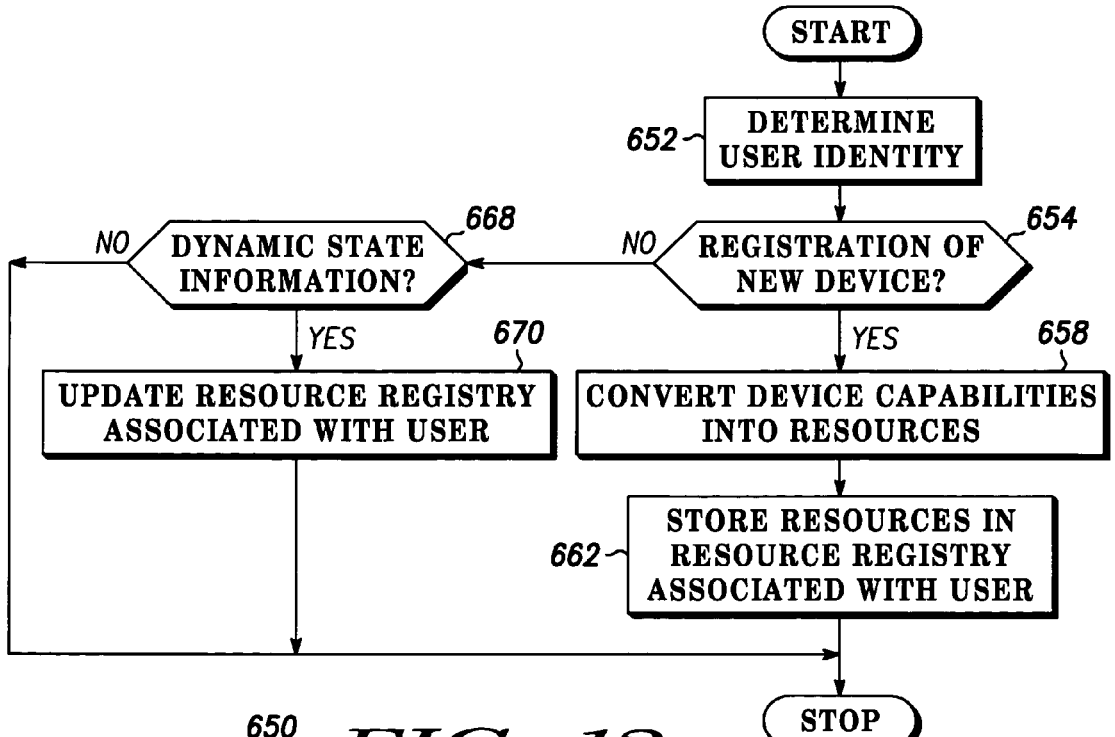
FIG. 12 is a flow diagram of an example method that may be implemented by the multi-device proxy server.

FIG. 12 is a flow diagram of an example method that may be implemented by the multi-device proxy server 112. In particular, the method 650 may be implemented by the user resources manager 604. The method 650 may be implemented by a processor configured by software on a tangible medium such as a CD-ROM, a floppy disk, a hard drive, a digital versatile disk (DVD), or a memory associated with the processor. Persons of ordinary skill in the art will readily appreciate that the entire method 650 or parts thereof could alternatively be executed by a device other than a processor, and/or embodied in firmware and/or dedicated hardware in a well known manner. Further, although the example method is described with reference to the flow diagram in FIG. 12, persons of ordinary skill in the art will readily appreciate that many other methods-may alternatively be used. For example, the order of execution of the blocks may be changed, and/or the blocks may be changed, eliminated, or combined.

The method 650 may be implemented upon receiving information from an owned rendering device. For instance, the multi-device proxy server 112 may receive information from an owned rendering device indicating resources and capabilities of the device as described with reference to FIG. 4. The method 650 is similar to the method 300 described with reference to FIG. 5.

At block 652, the identity of the user may be determined. Information related to the user's identity (e.g., name, user identification, login name, etc.) may be included with the received information from the owned rendering device. Additionally, the user resources manager 604 may send a message to the owned device 120 prompting the user to submit information related to the user's identity (e.g., name, user identification, login name, password, etc.).

At block 654, it may be determined whether information received from the owned rendering device 120 corresponds to a registration of a new device. If it is a registration of a new device, the flow may proceed to block 658. At block 658, the device capabilities of the new device may be converted into one or more resources. At block 662, the one or more resources determined at block 658 may be stored in a resource registry associated with the user. The resource registry may indicate, for example, resources available to the user. Referring back to FIG. 8, the resource registry may be included in the user resources database 516.

If at block 654 it is determined that the received information is not a registration of a new device, the flow may proceed to block 668. At block 668, it may be determined whether the received information corresponds to dynamic state information for an owned rendering device 120. If it does correspond to dynamic state information, the flow may proceed to block 670. At block 670, the dynamic state information may be used to update corresponding resource information in the resource registry associated with the user.

Figure 13:
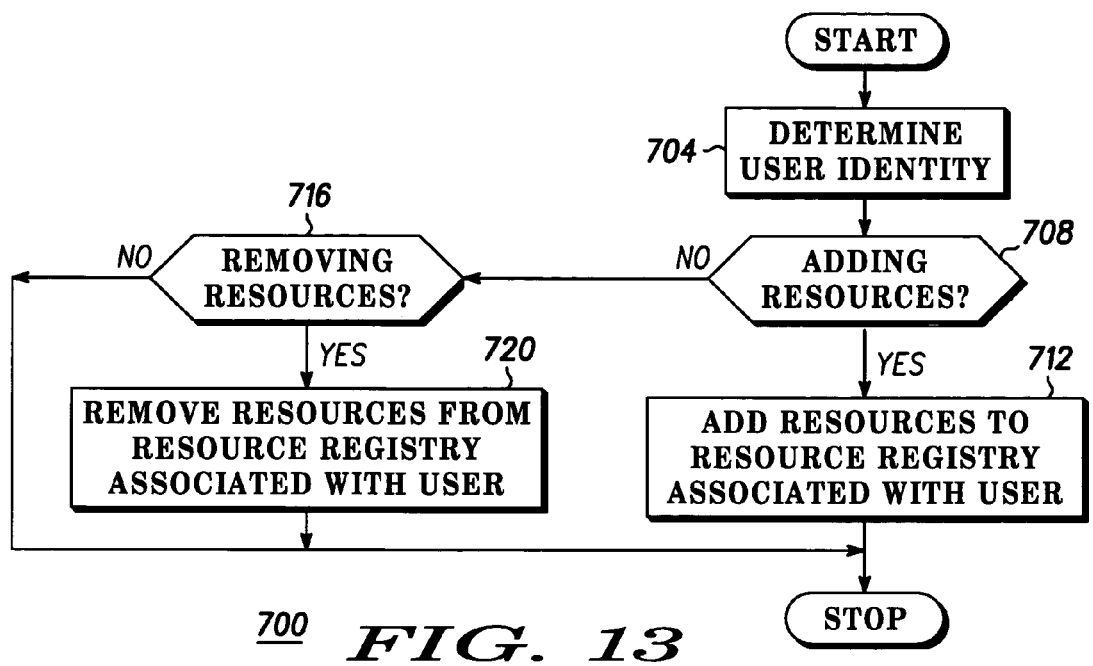
FIG. 13 is a flow diagram of an example method that may be implemented by the multi-device proxy server.

FIG. 13 is a flow diagram of an example method that may be implemented by the multi-device proxy server 112. In particular, the method 700 may be implemented by the user resources manager 604. The method 700 may be implemented by a processor configured by software on a tangible medium such as a CD-ROM, a floppy disk, a hard drive, a digital versatile disk (DVD), or a memory associated with the processor. Persons of ordinary skill in the art will readily appreciate that the entire method 700 or parts thereof could alternatively be executed by a device other than a processor, and/or embodied in firmware and/or dedicated hardware in a well known manner. Further, although the example method is described with reference to the flow diagram in FIG. 13, persons of ordinary skill in the art will readily appreciate that many other methods may alternatively be used. For example, the order of execution of the blocks may be changed, and/or the blocks may be changed, eliminated, or combined.

The method 700 may be implemented upon receiving information relating to the addition or removal of devices available to the user. For instance, the multi-device proxy server 112 may receive information from an owned rendering device or the resource manager 124 indicating that additional resources are available or that resources are no longer available as described with reference to FIGS. 6 and 7.

At block 704, the identity of the user may be determined. Block 704 may be implemented in a manner similar to block 652 of FIG. 12. At block 708, it may be determined whether additional resources are available to the user. If additional resources are available to the user, the flow may proceed to block 712. At block 712, the additional resources may be added to the resource registry associated with the user.

If at block 708, it is determined that additional resources are not available, it may be determined at block 716 if resources that were available to the user are no longer available. If resources are no longer available, the flow may proceed to block 720. At block 720, the resources that are no longer available to the user may be removed from the resource registry associated with the user.

User Preferences

Referring again to FIGS. 8 and 11, information from the user preferences database 512 may be used by the mapping generator 610 to generate a mapping of content types to devices. The user preference information may be assigned to a user based on one or more default configurations, or may be obtained from the user, for example, when the user registers for use of the multi-device proxy server 112, upon requesting content via the multi-device proxy server 112, etc. The user preference information may be modified, for example, upon the user's request, upon receiving a type of content for which the user has not yet provided preference information, upon using a particular device or device type for which the user has not yet provided preference information, etc.

The user preference information stored in the database 512 may be represented in a variety of formats. For example, the user preference information may be represented in a utility function format. Examples of user preference information in a utility function format will now be described with reference to FIGS. 14, 15, and 16. For ease of explanation, particular examples will be described, where the particular examples are illustrated in tabular format.

FIG. 14 is a table illustrating one example format for representing user preferences related to preferred devices for rendering particular types of content. In particular, FIG. 14 illustrates an example table 800 for representing user preferences related to delivering types of content to particular devices.

Rows of the table 800 may correspond to particular devices or device types, and columns of the table 800 may correspond to content types (e.g., text, graphics, video, audio, etc.). The list of devices may include devices currently available to the user, a list of devices that the user has used in the past, a list of devices specified by the user, a default list of devices, etc.

A utility of a particular type of content delivered to a particular device may be represented as a number in a range. In the example of FIG. 14, the range may be between 0 and 10, inclusive, where a value of 0 indicates lowest utility, and a value of 10 indicates the highest utility. The example table 800 indicates that delivering text content to a PDA provides high utility, whereas delivering graphics to the PDA provides a lower utility, and delivering video or audio provides the lowest utility. For example, the display of the PDA may be adequate for displaying text, but video on the PDA may be of poor quality. Similarly, the PDA may not include an audio system.

FIG. 15 is a table illustrating one example format for representing user preferences related to preferred communication links for delivering content to particular types of devices. In particular, FIG. 15 illustrates an example table 840 for representing user preferences related to preferred communication links for delivering content to particular devices.

Rows of the table 840 may correspond to particular devices or device types, and columns of the table 840 may correspond to particular communication links or communication link types (e.g., a wireless LAN (WLAN), a general packet radio service (GPRS) network, etc.). The list of devices may include devices currently available to the user, a list of devices that the user has used in the past, a list of devices specified by the user, a default list of devices, etc. The list of links may include links currently being utilized by the user, a list of links that the user has used in the past, a list of links specified by the user, a default list of links, etc.

A utility of using a particular communication link to deliver content to a particular device may be represented as a number in a range. In the example of FIG. 15, the range may be between 0 and 10, inclusive, where a value of 0 indicates lowest utility, and a value of 10 indicates the highest utility. The example table 840 indicates that delivering content to a cellular phone via a GPRS link provides higher utility than via a WLAN link. Additionally, the table 840 indicates that delivering content to a PDA or laptop computer via a WLAN link provides higher utility that via a GPRS link.

FIG. 16 is a table illustrating one example format for representing user preferences related to whether content should be delivered to the same device or different devices. In particular, FIG. 16 illustrates an example table 860 for representing user preferences related to whether components of one or more content sessions should be delivered to the same or different devices. For example, it may be easier to synchronize video and audio corresponding to a movie via a single device rather than trying to synchronize video and audio split across two devices, or having to view the audio and video on two devices with a slight time delay between the video and audio.

The rows and columns of the table 860 may correspond to particular components of one or more content sessions. In the example of FIG. 16, the suffix indicates the session to which a component belongs (i.e., "Caption 1," "Audio 1," and "Video 1" are components of a first content session, and "Audio 2" is a component of a second content session, different from the first content session). The list of components may include components of sessions that the user has requested to be delivered, a list of possible components, a default list of components, etc.

A utility of a component being delivered via the same device as another component may be represented as a number in a range. In the example of FIG. 16, the range may be between 0 and 100, inclusive, where a value of 0 indicates lowest utility, and a value of 100 indicates the highest utility. Additionally, a large negative number (e.g., −100) may be used to represent a strong preference for the components not to be delivered via the same device.

The example table 860 indicates a high utility where the audio and video components of a first session (i.e., Audio 1 and Video 1) are delivered to the same device. Additionally, the table 860 indicates a lower utility where the caption and the video components of the first session (i.e., Caption 1 and Video 1) are delivered to the same device. Similarly, the table 860 indicates a low utility where the caption and the audio components of the first session (i.e., Caption 1 and Audio 1) are delivered to the same device. Further, the table 860 indicates strong preference that an audio component of a second session (i.e., Audio 2) not be delivered to the same device as the device or devices to which the components of the first session are being delivered.

Although the above examples of utility function representations are described in the format of tables, those of ordinary skill in the art will appreciate that utility function representations may be provided in a variety of formats. Additionally, the above examples describe particular numerical values and ranges, those of ordinary skill in the art will appreciate that a variety of values and ranges may be utilized in different implementations.

Further, although user preferences are described above in utility function representations, those of ordinary skill in the art will appreciate that user preferences may be represented in other ways as well. Additionally, other types of user preferences may be employed as well. For example, preferences may be based on device capabilities. For instance, a user may prefer rendering audio on a device having stereo audio capability rather than a device having only mono audio capability. Additionally, preferences may be based on the nature of the information included in the content. For example, it may be preferable to display large amounts of text on a desktop computer rather than a PDA. Additionally, it may be preferable to display certain information that the user does not want others to view on the user's PDA, rather than on a shared display, even if the shared display could render the content much more adequately than the PDA.

Mapping Generator

Referring again to FIGS. 8 and 11, the mapping generator 610 generally may receive user preferences information from the user preferences database 512, information relating to resources available to the user from the user resources database 516, and information relating to the content requested by the user from the session state database 520. Based on this information, the mapping generator 610 may generate a mapping of content types to devices available to the user. The mapping may also include information for delivering content to the devices via particular communication links (e.g., a WLAN link vs. a GPRS link).

Figure 17:
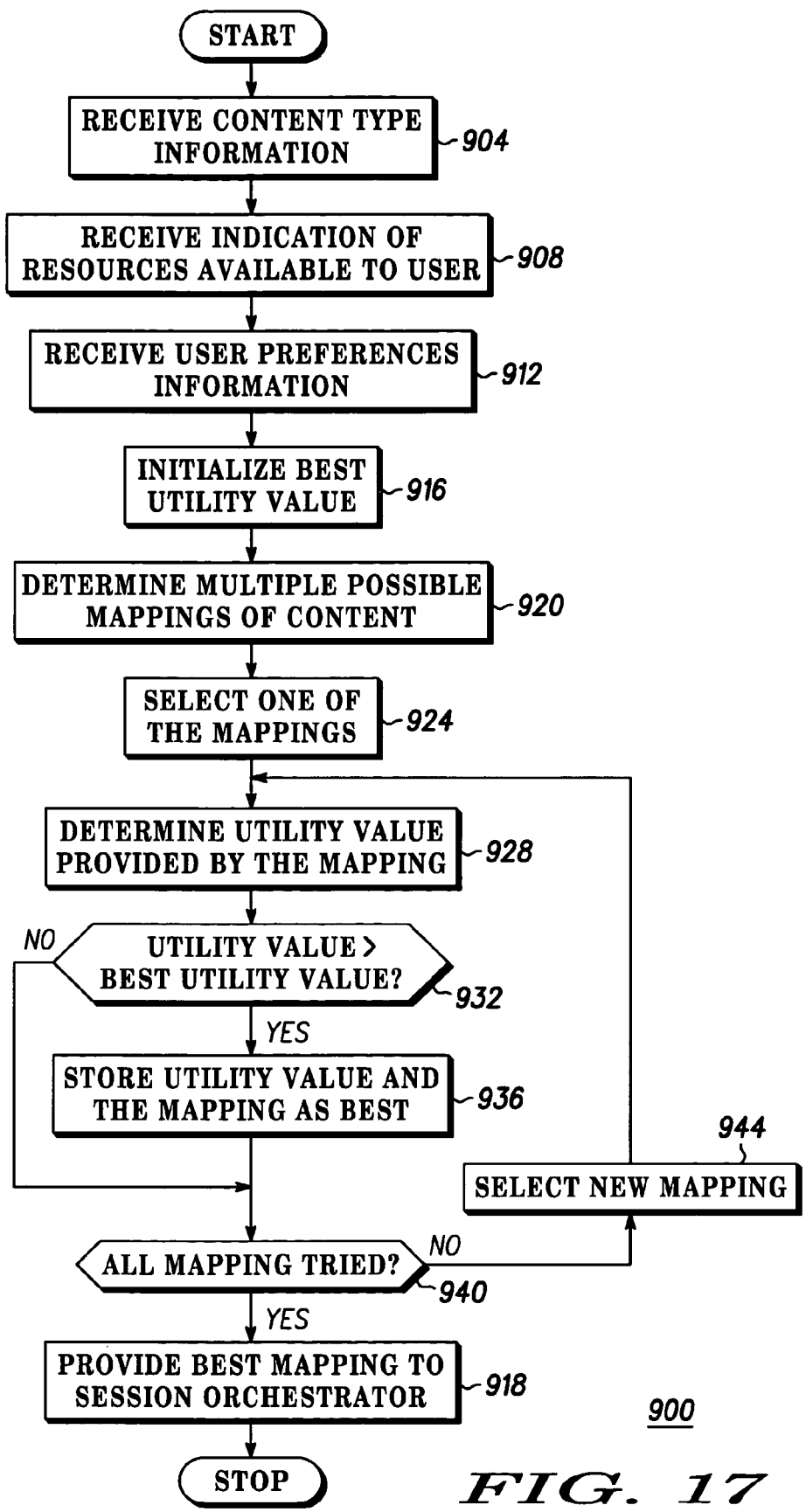
FIG. 17 is a flow diagram of an example method that may be implemented by the delivery control subsystem.

FIG. 17 is a flow diagram of an example method that may be implemented by the delivery control subsystem 504. In particular, the method 900 may be implemented by the mapping generator 610. The method 900 will be described with reference to FIGS. 8 and 11. The method 900 may be implemented by a processor configured by software on a tangible medium such as a CD-ROM, a floppy disk, a hard drive, a digital versatile disk (DVD), or a memory associated with the processor. Persons of ordinary skill in the art will readily appreciate that the entire method 900 or parts thereof could alternatively be executed by a device other than a processor, and/or embodied in firmware and/or dedicated hardware in a well known manner. Further, although the example method is described with reference to the flow diagram in FIG. 17, persons of ordinary skill in the art will readily appreciate that many other methods may alternatively be used. For example, the order of execution of the blocks may be changed, and/or the blocks may be changed, eliminated, or combined.

At block 904, content type information for a particular session may be received. For example, the content type information may be received from session state database 520. The content type information may indicate, for example, that a particular session may include text, video, and audio.

At block 908, an indication or indications of resources available to the user associated with the session may be received. For instance, a list of available resources may be received from the user resources database 516. As an example, the list of resources may indicate that the available resources includes an audio system and a display system on a cell phone, and a display system on a laptop computer. Additionally, the list of resources may indicate WLAN and GPRS links available on both the cell phone and the laptop computer.

At block 912, user preferences information may be received, for example, from the user preferences database 512. As described with reference to FIGS. 14-16, the user preferences information may be represented as one or more utility function representations.

At block 916, a best utility value may be initialized. For example, the best utility value may be initialized to reflect a very low utility. At block 920, multiple possible mappings of content types in the session to devices and communication links available to the user may be generated. For example, all of the possible mappings may be generated. The content types in the session may be indicated by the information received at block 904. The devices and communication links available to the user may be determined by the information received at block 908. The multiple possible mappings may be generated, for example, as a list of possible mappings.

At block 924, one of the possible mappings generated at block 920 may be selected. For example, if a list of possible mappings is generated at block 920, the first mapping in the list may be selected. As alternatives, one of the mappings may be randomly or pseudo-randomly selected, the last mapping in the list may be selected, etc.

At block 928, a utility value of the selected mapping may be generated. The utility value may be generated, for example, according to one or more utility function representations received at block 912. At block 932, the utility value generated at block 928 is compared with a best utility value. If at block 932, the utility value generated at block 928 indicates a higher utility than the current best utility value, the flow may proceed to block 936. At block 936, the utility value generated at block 928 may be stored as the new best utility value. Additionally, an indication of the mapping corresponding to the new best utility value may be stored. If at block 932 the utility value generated at block 928 does not indicate a higher utility than the current best utility value, the flow may proceed to block 940.

At block 940, it may be determined whether all of the mappings generated at block 920 have been tried. If all of the mappings have not been tried, then at block 944 a new mapping may be selected, and the flow may proceed back to block 928. If at block 940 it is determined that all of the mappings have been tried, the flow may proceed to block 948. At block 948, the best mapping may be provided to the session orchestrator 620.

Figure 18:
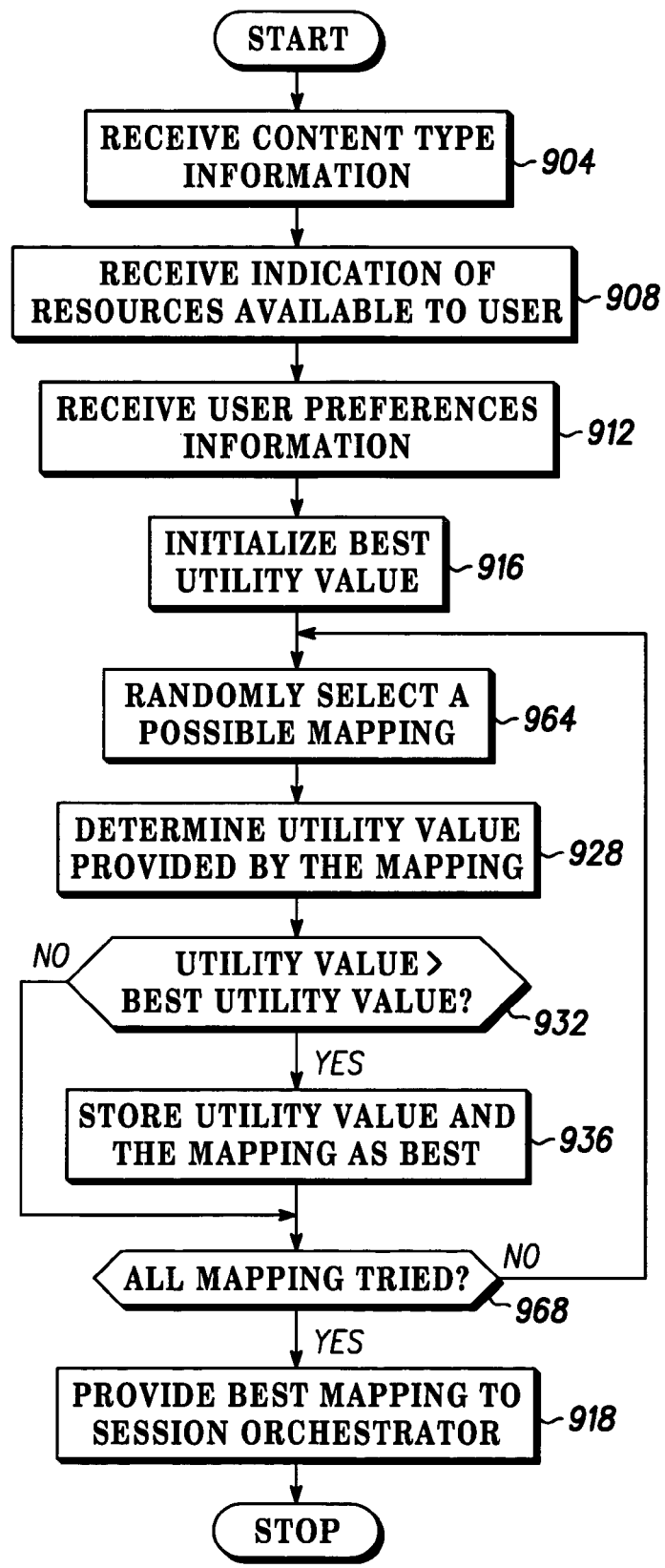
FIG. 18 is a flow diagram of another example method that may be implemented by the delivery control subsystem.

FIG. 18 is a flow diagram of another example method that may be implemented by the delivery control subsystem 504. In particular, the method 960 may be implemented by the mapping generator 610. The method 960 will be described with reference to FIGS. 8 and 11. The method 960 may be implemented by a processor configured by software on a tangible medium such as a CD-ROM, a floppy disk, a hard drive, a DVD, or a memory associated with the processor. Persons of ordinary skill in the art will readily appreciate that the entire method 960 or parts thereof could alternatively be executed by a device other than a processor, and/or embodied in firmware and/or dedicated hardware in a well known manner. Further, although the example method is described with reference to the flow diagram in FIG. 18, persons of ordinary skill in the art will readily appreciate that many other methods may alternatively be used. For example, the order of execution of the blocks may be changed, and/or the blocks may be changed, eliminated, or combined.

The method 960 includes many of the same blocks as the method 900 of FIG. 17. For examples, blocks 904, 908, 912, 916, 928, 932, 936, and 948 may be the same.

At block 964, a possible mapping may be randomly or pseudo-randomly determined. At block 968, it may be determined if all mappings have been tried. As one example, it may be determined whether all of the possible mappings have been tried. As another example, it may be determined whether a predetermined number of mappings have been tried, or whether block 964 was invoked a predetermined number of times.

The mapping generator 610 (FIG. 11) may be invoked one or more times during a session. For example, the mapping generator 610 may be invoked in response to initially receiving content that was requested by the user. Additionally, the mapping generator 610 may be invoked during a session when additional resources become available to the user, or when resources allocated to the user become unavailable. Additionally, the mapping generator 610 may be invoked when the user leaves a neighborhood or enters a new neighborhood. Entering or leaving a neighborhood may be detected manually, for example, by the user notifying the multi-device proxy server 112 of the neighborhood change. Additionally, entering or leaving a neighborhood may be detected automatically, for example, via user device interaction with a resource manager 124, via a location detection system such as a wide area positioning system (e.g., a global positioning system (GPS), a Loran-C system, etc.), a local area positioning system (e.g., an in-building location system), etc.

Session Orchestrator

Referring again to FIGS. 8 and 11, the session orchestrator 620 generally may receive user mapping information from the mapping generator 610 and information relating to the types of content in the current session. Then, the session orchestrator 620 may generate control signals for controlling the content transfer protocol proxy so that the various types of content are delivered to the appropriate rendering devices, and via the appropriate communication links, according to the mapping information. As will be described in more detail below, the session orchestrator 620 may also generate control signals for controlling the application downloader 524 and transcoders (local or external) via the transcoder interface 528.

Figure 19:
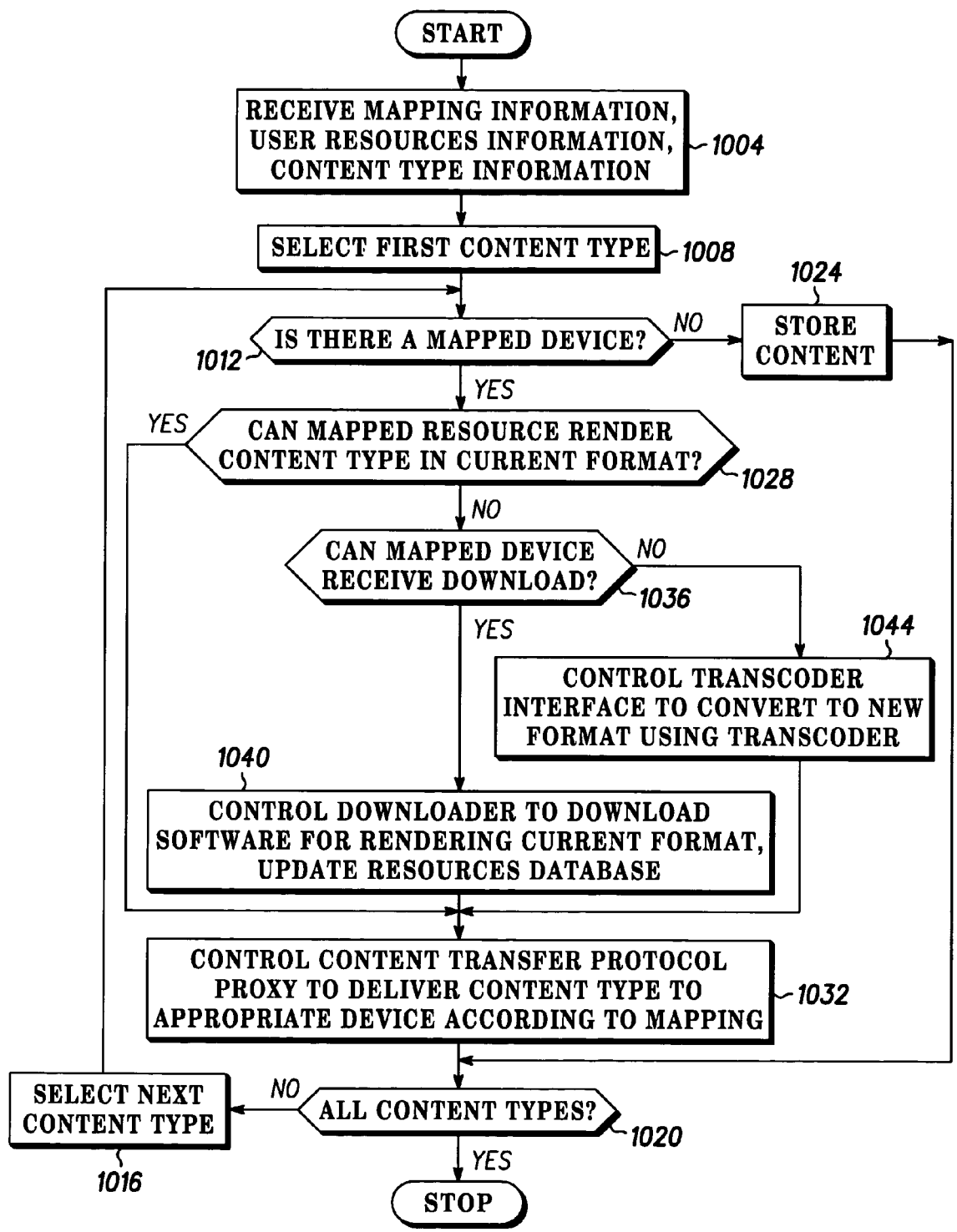
FIG. 19 is a flow diagram of an example method that may be implemented by the delivery control subsystem.

FIG. 19 is a flow diagram of an example method that may be implemented by the delivery control subsystem 504. In particular, the method 1000 may be implemented by the session orchestrator 620. The method 1000 will be described with reference to FIGS. 8 and 11. The method 1000 may be implemented by a processor configured by software on a tangible medium such as a CD-ROM, a floppy disk, a hard drive, a digital versatile disk (DVD), or a memory associated with the processor. Persons of ordinary skill in the art will readily appreciate that the entire method 1000 or parts thereof could alternatively be executed by a device other than a processor, and/or embodied in firmware and/or dedicated hardware in a well known manner. Further, although the example method is described with reference to the flow diagram in FIG. 19, persons of ordinary skill in the art will readily appreciate that many other methods may alternatively be used. For example, the order of execution of the blocks may be changed, and/or the blocks may be changed, eliminated, or combined.

At block 1004, the mapping, user resources, and content type information may be received from the mapping generator 610, the user resources database 516, and the session state database 520, respectively. At block 1008, a first content type from the content types of the session may be selected. At block 1012, it may be determined whether the mapping indicates there is a corresponding resource/device for the content type. If there is no corresponding resource/device, the flow may proceed to block 1016. At block 1016, the content of the content type for which a resource/device is not available may be stored. For example, the content may be temporarily stored until a resource for rendering the content type becomes available. Then, the flow may proceed to block 1020, where it may be determined if other content types of the session still remain. If all of the content types in the session have been handled, the flow may end. If other content types still remain, the flow may proceed to block 1024. At block 1024, a next content type in the session may be selected, and the flow may proceed back to block 1012.

If at block 1012 it is determined that there is a mapped device that corresponds to the content type, the flow may proceed to block 1028. At block 1028, it may be determined whether the mapped resource to which the content type corresponds can render the content type in its current format. For example, audio content may be in MP3 format, whereas the audio resource of the device selected by the mapping may be able to handle audio only in a different format. If the mapped resource can render the content type in its current format, the flow may proceed to block 1032. At block 1032, the content transfer protocol proxy 536 may be controlled to deliver the content type to the device indicated by the mapping information received at block 1004.

If at block 1028, it is determined that the mapped resource cannot render the content in its current format, the flow may proceed to block 1036. At block 1036, it may be determined whether the mapped device can receive a software download to permit it to render the content type in its current format. For example, the device may be incapable of receiving the download. Also, a user of a device may be unwilling to permit such downloads. Additionally, a software download for permitting the device to render the content type in its current format may not be available. If the mapped device can receive the software download, the flow may pass to block 1040.

At block 1040, the application downloader 524 may be controlled to download the application software to the mapped device. Additionally, the user resources database 516 may be updated to reflect the resources of the device have been changed via the downloaded application. Then, the flow may proceed to block 1032.

At block 1036, if it determined that the device cannot receive the application download, the flow may proceed to block 1044. At block 1044, the transcoder interface 528 may be controlled to convert, using a transcoder, the current format of the content type into a new format that can be rendered by the mapped resource. The transcoder interface 528 may cause the content transfer protocol proxy to send the content type to a transcoder (local or external), and the content transfer protocol proxy may receive the content type in a new format from the transcoder. Then, the flow may proceed to block 1032.

User Interface Mechanisms for Multi-Device Rendering

In some examples, the multi-device proxy server 112 may modify the content with user interface mechanisms that assist a user with interpreting and navigating content being rendered on multiple devices. FIG. 20 is a block diagram of an example subsystem 1100 for providing such user interface mechanisms. The particular user interface mechanisms that the example subsystem 1100 provides are coined "wormholes." Further details of systems for implementing such user interface mechanisms are provided in U.S. patent application Ser. No. 10/334,848, entitled "Method and Apparatus for Linking Multimedia Content Rendered Via Multiple Devices". In general, a wormhole may be an icon, or other indicator, within the content rendered on the user's device that indicates to the user that portions of the content have been removed and are being, or can be rendered, on a different device. The wormholes may permit the user to understand the content context in which this removed content originated. Additionally, the user may use the wormhole mechanism to cause the removed content to be rendered, or to be indicated to the user. For example, a user viewing a web page with removed pictures on a PDA could activate a wormhole on the PDA, causing the removed picture to flash on a shared display.

For ease of explanation, the wormhole subsystem 1100 will be described in the context of web pages. Additionally, the wormhole subsystem 1100 will be described with reference to FIG. 8.

The wormhole subsystem 1100 may be, in whole or in part, a component of the multi-device proxy server 112, or may be implemented as a separate system. In general, the wormhole subsystem 1100 may receive content that has been transcoded for rendering on multiple devices, and then modifies the transcoded content to include user interface mechanisms (wormholes). Additionally, the wormhole subsystem 1100 may receive indications that a wormhole was activated, and may instruct a wormhole client on a rendering device 120 to respond to the activation. For example, a user may be viewing a web page rendered such that text and wormholes appear on a PDA and images appear on a desk top computer. When a user activates a wormhole via the PDA, the wormhole subsystem 1110 may instruct the desk top computer displaying an image associated with the wormhole to cause the image to blink.

The wormhole subsystem may include a wormhole inserter 1104, a wormhole database 1108, and a wormhole manager 1112. The wormhole inserter 1104 may be a component of the local transcoder 532. The wormhole inserter 1104 may receive a first subset of the requested content, and may generate a modified first subset of the content that includes wormholes.

FIG. 21 is a flow diagram of an example method that may be implemented by the wormhole inserter 1104. The method 1140 may be implemented by a processor configured by software on a tangible medium such as a CD-ROM, a floppy disk, a hard drive, a digital versatile disk (DVD), or a memory associated with the processor. Persons of ordinary skill in the art will readily appreciate that the entire method 1140 or parts thereof could alternatively be executed by a device other than a processor, and/or embodied in firmware and/or dedicated hardware in a well known manner. Further, although the example method is described with reference to the flow diagram in FIG. 21, persons of ordinary skill in the art will readily appreciate that many other methods may alternatively be used. For example, the order of execution of the blocks may be changed, and/or the blocks may be changed, eliminated, or combined.

At block 1144, a first subset of the requested content may be received. For example, a web page requested by the user may have been partitioned into content types (e.g., text, graphics, etc.). The first subset of content may correspond to a first transcoded web page that includes text of the requested web page, but not many of the graphics. A second subset of the content may correspond to a second transcoded web page that includes the graphics missing from the first transcoded web page.

At block 1148, some or all of the originally requested content that is missing from the first subset may be determined. For example, the graphics missing from the first web page may be determined.

At block 1152, wormholes corresponding to the missing content may be inserted in the first subset of content. The wormholes may include an indication of the content to which they correspond. Additionally, the wormholes may include an indication of the rendering device on which the missing content is being rendered, or should be rendered. These indications may be included in the wormholes themselves, or may be stored in the wormhole database 1108.

For example, wormholes corresponding to the graphics missing from the first web page and included in the second web page may be inserted in the first web page. The wormholes may include indications of the content in the second web page to which they correspond, and the device on which the second web page is being rendered.

A wormhole may include, for example, a button, a link, an icon, etc. The wormhole may provide an indication of the content or the type of content that was removed. For example, if a picture was removed, the wormhole may include an icon that indicates a picture was removed, text that describes the picture, etc.

The wormhole inserter 1104 may also store information relating to the inserted wormholes in the wormhole database 1108. For example, the wormhole information may include an indication of the missing content to which it relates, on which device the missing content is being rendered, or should be rendered, etc. As an alternative, some or all of this information may be encoded in the wormhole itself.

When a user activates a wormhole on a rendering device 120 (e.g., by selecting, clicking on, etc. the wormhole), the rendering device 120 may transmit an indication of the wormhole selection to the multi-device proxy server 112. The indication may include information that would enable the wormhole subsystem 1100 to determine the selected wormhole in the wormhole database 1108. As an alternative, the indication may include information to enable the wormhole subsystem 1100 to determine the missing content to which the selected wormhole relates, and the rendering device 120 on which the missing content is being rendered, or should be rendered.

The rendering device 120 may transmit the indication, for example, to the content transfer protocol proxy 536 or the communication agent 508 of the multi-device proxy server 112.

FIG. 22 is a flow diagram of an example method that may be implemented by the wormhole manager 1112. The method 1170 may be implemented by a processor configured by software on a tangible medium such as a CD-ROM, a floppy disk, a hard drive, a digital versatile disk (DVD), or a memory associated with the processor. Persons of ordinary skill in the art will readily appreciate that the entire method 1170 or parts thereof could alternatively be executed by a device other than a processor, and/or embodied in firmware and/or dedicated hardware in a well known manner. Further, although the example method is described with reference to the flow diagram in FIG. 22, persons of ordinary skill in the art will readily appreciate that many other methods may alternatively be used. For example, the order of execution of the blocks may be changed, and/or the blocks may be changed, eliminated, or combined.

At block 1174, an indication of a wormhole selection may be received. The indication may be received, for example, via the content transfer protocol proxy 536 or the communication agent 508 of the multi-device proxy server 112.

At block 1178, the content to which the wormhole corresponds may be determined. Additionally, the device that is rendering, or should render, the corresponding content may be determined. For example, the wormhole manager 1112 may determine, via the wormhole itself or via the wormhole database 1108, the missing content to which the wormhole corresponds and the rendering device 120 on which the missing content is to be rendered, or should be rendered.

At block 1182, the rendering device that is rendering, or should be rendering, the corresponding content, may be instructed to indicate the content to which the wormhole corresponds. For example, if the content is being rendered, the rendering device 120 may be instructed to cause the content to blink, may generate an outline around the content, may cause a caption to appear below or over the content, may cause the caption to blink, etc. If the content is not yet rendered on the rendering device, the wormhole manager 1112 may cause the content to be sent to an appropriate rendering device and rendered.

While the invention is susceptible to various modifications and alternative constructions, certain illustrative embodiments thereof have been shown in the drawings and are described in detail herein. It should be understood, however, that there is no intention to limit the disclosure to the specific forms disclosed, but on the contrary, the intention is to cover all modifications, alternative constructions and equivalents falling within the spirit and scope of the disclosure as defined by the appended claims.

What is claimed is:

1. A method for delivering content to be rendered by multiple devices, the method comprising:

receiving, at a resource management node, indications of rendering resources available to a user, the rendering resources provided by a plurality of devices, each rendering resource indication indicating an ability to render a particular content type out of a plurality of possible content types, each of the plurality of devices being coupled to a network, and wherein each of the plurality of devices provides at least one rendering resource indicated as available for use by the user;

receiving, at the resource management node, a content request transmitted by the user;

the resource management node retrieving the content requested by the user, the content including a plurality of different content types;

the resource management node mapping each content type in the content to an available rendering resource across the plurality of devices by selecting which rendering resource to use for each content type as a function of (i) the content type and (ii) the indications of rendering resources available to the user for that content type across the plurality of devices, wherein at least a first content type in the content is mapped to a first particular device out of the plurality of devices and a second content type in the content, different from the first content type, is mapped to a second particular device out of the plurality of devices different from the first particular device; and the resource management node delivering each content type in the retrieved content to the plurality of devices according to the mapping.

2. The method as defined in claim 1, wherein mapping each content type in the plurality of different content types to available resources across the plurality of devices comprises:

the resource management node accessing a preferences database that includes first pre-defined user ratings of each available resource for a particular content type and includes second pre-defined user ratings setting forth a preference for particular content types to not be split up across different devices; and the resource management node selecting which rendering resource to use for each content type also as a function of the first and second user ratings set forth in the preferences database.

3. The method as defined in claim 2, wherein the resource management node selecting which rending resource to use for each content type also as a function of the first and second user ratings set forth in the preference database comprises iteratively comparing different combinations of devices and content types until a highest valued user rating combination is reached.

4. The method as defined in claim 2, wherein, in accordance with the second pre-defined user ratings setting forth preferences for a first content type and a second content type in the content not to be split up, the resource management node delivering the first content type and the second content type to a first one of the plurality of devices and a third content type in the content to a second one of the plurality of devices.

5. The method as defined in claim 2, further comprising:

the resource management node accessing a preferences database that includes third pre-defined user ratings of communication links for delivering content types to the plurality of devices; and the resource management node selecting which communication link to use for delivering each content type also as a function of the third user ratings set forth in the preferences database.

6. The method as defined in claim 1, further comprising:

the resource management node providing a software application to a first one of the plurality of devices so as to add an additional rendering resource available for rendering a particular content type in the content at the first one of the plurality of devices; and the resource management node subsequently delivering a corresponding particular content type of the content to the first one of the plurality of devices for rendering via the software application.

7. The method as defined in claim 1, wherein a particular one of the content types in the content is in a first native format, the method further comprising the resource management node determining if the device to which the one content type is mapped is capable of processing the first native format.

8. The method as defined in claim 7, further comprising:
the resource management node providing the particular one of the content types to a transcoder to transcode the one content type from the first native format to a second different format; and
the resource management node delivering to the device to which the one content type is mapped the one content type in the second different format.

9. A resource management server for delivering content to be rendered by multiple devices, the resource management server comprising:
a computer operatively coupled to a content server via a first network, and operatively coupled to a plurality of rendering devices via a second network, each of the plurality of rendering devices provides at least one rendering resource indicated as available for use by a user, the resource management computer comprising:
a memory;
a processor coupled to the memory, the processor configured to
receive indications of rendering resources available to a user, the rendering resources provided by the plurality of rendering devices, each rendering resource indication indicating an ability to render a particular content type out of a plurality of possible content types;
receive a content request transmitted by the user;
retrieve the content requested by the user, the content including a plurality of different content types, the content received from the content server via the first network,
map each content type in the content to an available rendering resource across the plurality of devices by selecting which rendering resource to use for each content type as a function of (i) the content type and (ii) the indications of rendering resources available to the user for that content type across the plurality of devices, wherein at least a first content type in the content is mapped to a first particular device out of the plurality of devices and a second content type in the content, different from the first content type, is mapped to a second particular device out of the plurality of devices different from the first particular device, and
deliver each content type in the retrieved content to the plurality of devices according to the mapping.

10. The method of claim 1, further comprising:
the resource management node inserting, in a first content type of the content delivered to a first one of the plurality of devices, indications of a second content type that was separated from the content and sent to a second one of the plurality of devices, so as to create a modified first content type;
wherein delivering each content type in the retrieved content comprises the resource management node delivering the modified first content type in place of the first content type.

11. The method of claim 10, further comprising receiving a notification of an activation of one of the inserted indications, and responsively causing a corresponding portion of the second content type to one of (i) be displayed at the second one of the plurality of devices to which it was sent and (ii) be visually augmented to indicate its presence at the second one of the plurality of devices to which it was sent.

12. The method of claim 1, further comprising, responsive to determining that none of the plurality of devices have a rendering resource able to render a particular content type in the content, at least temporarily storing the particular content type at the resource management node.

13. A resource management server for delivering content to be rendered by multiple devices, the resource management server comprising:
means for receiving indications of rendering resources available to a user, the rendering resources provided by a plurality of devices, each rendering resource indication indicating an ability to render a particular content type out of a plurality of possible content types, each of the plurality of devices being coupled to a network, and wherein each of the plurality of devices provides at least one rendering resource indicated as available for use by the user;
means for receiving, at the resource management node, a content request transmitted by the user;
means for retrieving the content requested by the user, the content including a plurality of different content types;
means for mapping each content type in the content to an available rendering resource across the plurality of devices by selecting which rendering resource to use for each content type as a function of (i) the content type and (ii) the indications of rendering resources available to the user for that content type across the plurality of devices, wherein at least a first content type in the content is mapped to a first particular device out of the plurality of devices and a second content type in the content, different from the first content type, is mapped to a second particular device out of the plurality of devices different from the first particular device; and
means for delivering each content type in the retrieved content to the plurality of devices according to the mapping.

* * * * *